(12) United States Patent
Oyama et al.

(10) Patent No.: US 10,610,789 B2
(45) Date of Patent: Apr. 7, 2020

(54) GAME SYSTEM, NON-TRANSITORY COMPUTER-READABLE MEDIUM, AND GAME CONTROL METHOD

(71) Applicant: Universal Entertainment Corporation, Tokyo (JP)

(72) Inventors: Masaki Oyama, Tokyo (JP); Atsushi Kumita, Tokyo (JP); Toshikazu Jinnouchi, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 0 days.

(21) Appl. No.: 16/140,743

(22) Filed: Sep. 25, 2018

(65) Prior Publication Data

US 2019/0091583 A1 Mar. 28, 2019

(30) Foreign Application Priority Data

Sep. 27, 2017 (JP) .................................. 2017-187163

(51) Int. Cl.
*A63F 13/00* (2014.01)
*A63F 9/24* (2006.01)
(Continued)

(52) U.S. Cl.
CPC .......... *A63F 13/795* (2014.09); *G07F 17/323* (2013.01); *G07F 17/3227* (2013.01);
(Continued)

(58) Field of Classification Search
CPC ....... A63F 13/46; A63F 13/795; A63F 13/798
See application file for complete search history.

(56) References Cited

U.S. PATENT DOCUMENTS

| | | | | |
|---|---|---|---|---|
| 6,839,435 B1* | 1/2005 | Iijima | ..................... | A63F 13/12 380/251 |
| 9,289,687 B2* | 3/2016 | Ostergren | ............... | A63F 13/10 |

(Continued)

OTHER PUBLICATIONS

"In-Game Leaderboards & Notifications". [dated Oct. 6, 2015], [online], [retrieved on Aug. 12, 2019]. <URL:https://en.help.roblox.com/hc/en-us/articles/204343250-In-Game-Leaderboards-and-Notifications>. 3 Pages. (Year: 2015).*

(Continued)

*Primary Examiner* — Milap Shah
(74) *Attorney, Agent, or Firm* — Lex IP Meister, PLLC

(57) ABSTRACT

A possibility of providing motives to continue a game is improved. A game system 100 stores a relation between user identification information corresponding to a user who plays a game and user identification information corresponding to another user who is a friend of the user, stores ranking determined based on the game history of plural users in association with the user identification information, when transiting to a rank screen 22 in which a predetermined number of sets of the user identification information of the users ranked at or above a predetermined rank is displayed, constructs and displays the rank screen 22 in which each set of user identification information is associated with each friend-request button 241b, and when a friend request is made by the friend-request button 241b, shifts to a state that allows these users to become friends.

6 Claims, 14 Drawing Sheets

(51) Int. Cl.
*A63F 13/795* (2014.01)
*G07F 17/32* (2006.01)
*A63F 13/46* (2014.01)
*A63F 13/798* (2014.01)

(52) U.S. Cl.
CPC .......... *G07F 17/3272* (2013.01); *A63F 13/46* (2014.09); *A63F 13/798* (2014.09); *A63F 2300/558* (2013.01)

(56) References Cited

U.S. PATENT DOCUMENTS

| | | | | |
|---|---|---|---|---|
| 9,299,064 | B1* | 3/2016 | Liu | G06Q 10/107 |
| 2003/0093168 | A1* | 5/2003 | Nagaoka | 700/91 |
| 2007/0156267 | A1* | 7/2007 | Nozaki | A63F 13/12 |
| | | | | 700/91 |
| 2008/0113805 | A1* | 5/2008 | David | A63F 13/12 |
| | | | | 463/42 |
| 2009/0176557 | A1* | 7/2009 | Hall | A63F 13/12 |
| | | | | 463/25 |
| 2011/0124417 | A1* | 5/2011 | Baynes | A63F 13/798 |
| | | | | 463/43 |
| 2011/0250969 | A1* | 10/2011 | Os | A63F 13/795 |
| | | | | 463/42 |
| 2011/0296004 | A1* | 12/2011 | Swahar | G06Q 10/10 |
| | | | | 709/224 |
| 2012/0322561 | A1* | 12/2012 | Kohlhoff | A63F 13/10 |
| | | | | 463/42 |
| 2013/0288788 | A1* | 10/2013 | Lim | A63F 13/795 |
| | | | | 463/31 |
| 2014/0012652 | A1* | 1/2014 | Levin | G06Q 30/0233 |
| | | | | 705/14.31 |
| 2014/0235337 | A1* | 8/2014 | Sawamura | A63F 13/12 |
| | | | | 463/31 |
| 2015/0072793 | A1* | 3/2015 | Okabayashi | A63F 13/58 |
| | | | | 463/42 |
| 2015/0224408 | A1* | 8/2015 | Hayashida | A63F 13/88 |
| | | | | 463/31 |
| 2016/0199739 | A1* | 7/2016 | Honda | G06Q 50/10 |
| | | | | 463/42 |
| 2016/0236095 | A1* | 8/2016 | Joo | A63F 13/12 |
| 2017/0173476 | A1* | 6/2017 | Schindler | A63F 13/87 |

OTHER PUBLICATIONS

"Trackmania Canyon—How Do You Add Friends?" [dated May 19, 2014], [online], [retrieved on Aug. 12, 2019]. <URL:https://steamcommunity.com/app/228760/discussions/0/540741859448828391/>. 2 Pages. (Year: 2014).*

* cited by examiner

FIG.6

FRIEND INFORMATION TABLE

| USER | FRIEND TARGET | STATUS |
|---|---|---|
| 11111111 | 33333333 | FRIEND |
| 11111111 | 44444444 | FRIEND |
| 11111111 | 55555555 | APPROVAL-WAITING STATE |
| 11111111 | 66666666 | BLOCK STATE |
| 11111111 | 77777777 | BLOCKED STATE |
| 22222222 | 88888888 | FRIEND |
| 22222222 | 99999999 | APPROVAL-WAITING STATE |
| ... | ... | ... |

FIG.7

USER INFORMATION TABLE

| USER | USER NAME | ACQUISITION COIN NUMBER | | | | NUMBER OF POINTS |
|---|---|---|---|---|---|---|
| | | SLOT GAME 01 | SLOT GAME 02 | ... | TOTAL | |
| 11111111 | AA | 153 | 57524 | ... | 1567678 | 47 |
| 22222222 | BB | 6354 | 5425 | ... | 543548 | 35 |
| 33333333 | CC | 65 | 5886 | ... | 32125 | 3 |
| 44444444 | DD | 8854 | 75 | ... | 148274 | 5 |
| 55555555 | EE | 57865 | 5256 | ... | 220563 | 24 |
| 66666666 | FF | 5458 | 54 | ... | 12542 | 5 |
| 77777777 | GG | 7463 | 8456 | ... | 78524 | 6 |
| ... | ... | ... | ... | ... | ... | ... |

FIG.8

RANK TABLE

| RANK | USER | USER NAME | ACQUISITION COIN NUMBER |
|---|---|---|---|
| 1 | 41234955 | A | 299891 |
| 2 | 00254897 | B | 297429 |
| 3 | 25489781 | C | 281296 |
| 4 | 15684568 | D | 278734 |
| 5 | 56005264 | E | 256121 |
| 6 | 00004567 | F | 232165 |
| 7 | 15410237 | G | 231984 |
| ... | ... | ... | ... |

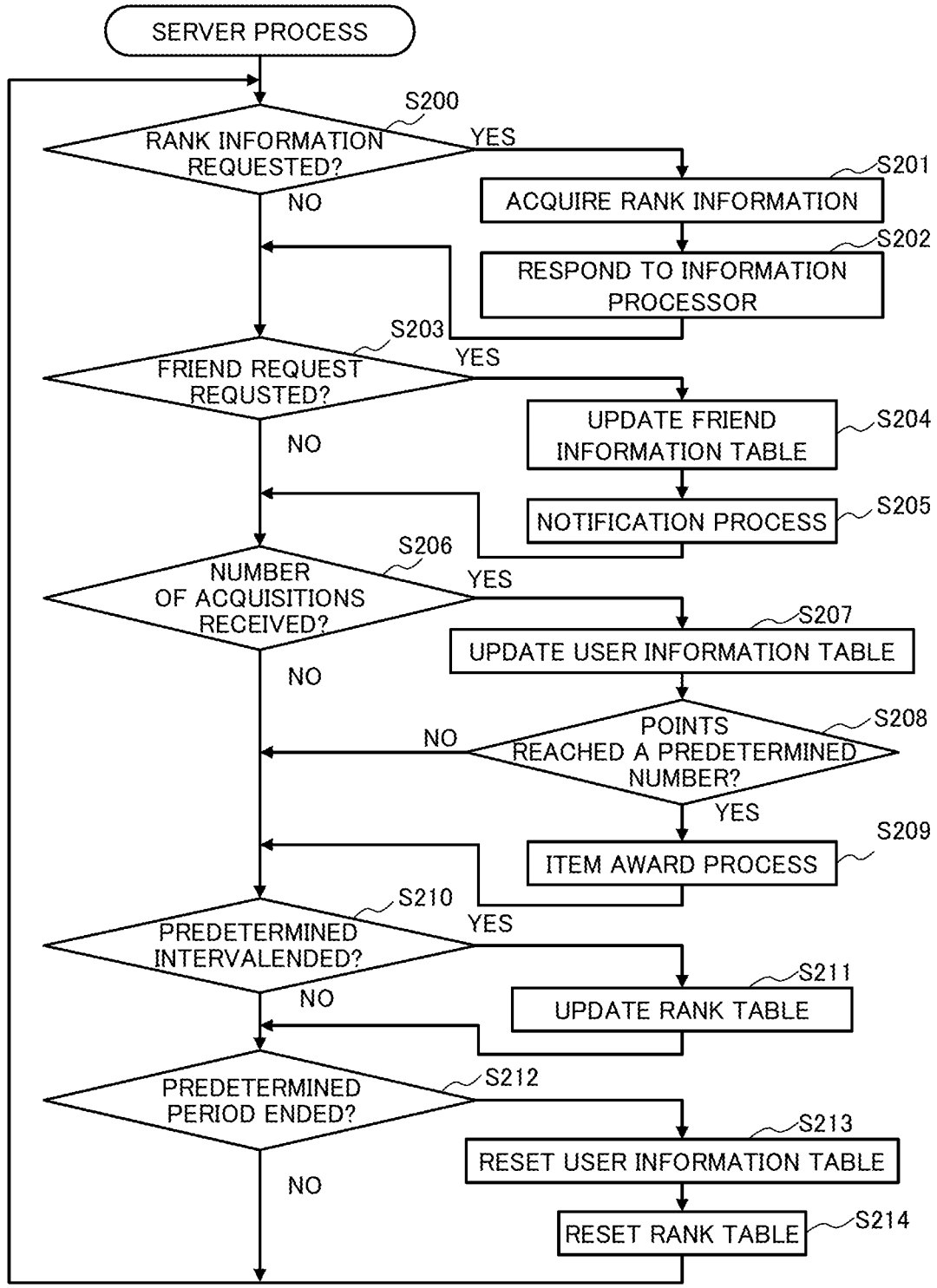

GAME SYSTEM, NON-TRANSITORY COMPUTER-READABLE MEDIUM, AND GAME CONTROL METHOD

CROSS-REFERENCE TO RELATED APPLICATION

The present application claims priority from Japanese Patent Application No. 2017-187163, which was filed on Sep. 27, 2017, the disclosure of which is herein incorporated by reference in its entirety.

BACKGROUND OF THE INVENTION

1. Field of the Invention

The present invention relates to a game system, a non-transitory computer-readable medium, and game control method.

2. Description of Related Art

Traditionally, there has been a structure a plurality of gaming terminals are connected via a server, and cooperation amongst the gaming terminals progresses a game. For example, the specification of U.S. Pat. No. 8,636,593 discloses a structure including a plurality of gaming terminals and a plurality of upper displays forming a single common effect display screen, wherein whether or not a common game is run is determined when each gaming terminal starts an independent special game, and an effect is performed only in a gaming terminal in which the common game is not run. Cooperation amongst the gaming terminals to progress the game has been traditionally considered as to be important to enhance players' interest in the game and the value of the gaming machine.

In recent years, games provided on mobile devices such as tablet computers and smartphones are becoming increasingly prevalent. In such games on mobile devices, cooperative game play by users has been highly valued. In this connection, unlike traditional dedicated gaming machines, it is common in such games that a user is able to "befriend" other users. The user builds affinity with the game when becoming friends with other users, and therefore game providers implement a friend request function in the game to induce the user to continue the game play for a long time.

However, each user has to find a friend who plays the same game in the real world, or even if he/she is allowed to find a friend during the game play, he/she has to find one from a list of randomly-selected users. Users who feel uncomfortable to send a friend request to an unknown user have difficulty in increasing the number of friends. Therefore, such users can not build affinity with the game, and this has been a reason why users quit playing the game.

SUMMARY OF THE INVENTION

In view of the above, it is an object of the present invention to provide a game system, a non-transitory computer-readable medium and a game control method whereby motives to continue a game are provided.

The present invention relates to a game system comprising a plurality of information processors, and a server configured to allow users to log in and run a game in the plurality of information processors, the system further comprising:

a display configured to display a screen on each of the information processors;
a memory storing a relation between the user identification information corresponding to a user who plays the game by using the plurality of information processors and the user identification information corresponding to another user who is a friend of the user; and
a controller,
the controller is programmed
to execute the processes of: storing, in the memory, ranking determined based on history of the game of the users, in association with the user identification information;
accepting a rank screen transition request for transition to the rank screen in which a predetermined number of sets of the user identification information of the users ranked at or above a predetermined rank is displayed;
referring to the memory in response to the rank screen transition request and acquiring the user identification information of the highly-ranked users at the ranking;
constructing the rank screen in which each set of the user identification information of the highly-ranked users at the ranking is associated with each friend-request button and displaying the rank screen on the display; and
when the friend-request button is operated on the rank screen, accepting the friend request for the user corresponding to that friend-request button from the user who has made the request by the information processor; and shifting to a state that allows these users to become friends.

According to the above arrangement, on the rank screen, users who are highly ranked based on the game history are displayed in association with the friend-request buttons. This makes it easy for users to send a friend request to a highly-ranked user, so that a lot of users would send a friend request to a highly-ranked user. As a result, it is possible to encourage users who wish to increase the number of friends to aim at becoming highly-ranked users, and it is possible to provide users with a motivation to continue the game until they become highly-ranked users.

In the game system of the present invention,
the controller may be programmed to execute the processes of:
outputting the number of acquisitions in accordance with a result of the game;
determining the ranking according to the cumulative number of acquisitions; and
making the friend associated with the user advantageous when the number of acquisitions of the user satisfies a predetermined condition.

According to the above arrangement, ranking is determined by the cumulative number of acquisitions outputted as a result of the game, and when the number of acquisitions outputted is equal to or larger than a threshold, friends of the user who outputs that number of acquisitions are made advantageous. Since the cumulative number of acquisitions of a highly-ranked user is larger than that of other users, it is recognized that such a user is likely to output the number of acquisitions that satisfies the predetermined condition. For this reason, the higher a user is ranked, the more friend-requests he or she is likely to receive. As a result, it is possible to encourage users who wish to increase the number of friends to aim at becoming highly-ranked users.

In the game system of the present invention,
the controller may be programmed to execute the processes of:
cumulatively storing points corresponding to the number of acquisitions of each of the users;

awarding the points to the friend associated with the user, when the number of acquisitions of the user satisfies a predetermined condition; and awarding an item for making the game advantageous to the user, when the points corresponding to the user reach a predetermined number.

According to the above arrangement, when a user outputs the number of acquisitions which satisfies a condition in the game, not only that user but also friends associated with that user acquire points corresponding to the number of acquisitions. The points are cumulatively stored for each user, and a user whose point reach a predetermined number acquires the item which makes the game advantageous. It is recognized from other users that the highly-ranked users output the large number of acquisitions, and as the ranking is higher, the user may get more friend-requests from other users who expect points from the friends. As a result, it is possible to encourage users who wish to increase the number of friends to aim at becoming highly-ranked users.

The present invention relates to a non-transitory computer-readable medium storing a game program which causes a computer including a display which shows a screen in an information processor which logs in a server connected to a plurality of information processors and a memory storing a relation between user identification information corresponding to a user who plays a game by using the plurality of information processors and user identification information corresponding to another user who is a friend of the user, to execute the processes of: storing, in the memory, ranking determined based on history of the game of the users, in association with the user identification information;

accepting a rank screen transition request for transition to the rank screen in which a predetermined number of sets of the user identification information of the users ranked at or above a predetermined rank is displayed;

referring to the memory in response to the rank screen transition request and acquiring the user identification information of the highly-ranked users at the ranking;

constructing the rank screen in which each set of the user identification information of the highly-ranked users at the ranking is associated with each friend-request button and displaying the rank screen on the display; and when the friend-request button is operated on the rank screen, accepting the friend request for the user corresponding to that friend-request button from the user who logs in the information processor, and has made the request by the information processor, and shifting to a state that allows these users to become friends.

According to the above arrangement, on the rank screen, users who are highly ranked based on the game history are displayed in association with the friend-request buttons. This makes it easy for users to send a friend request to a highly-ranked user, so that a lot of users would send a friend request to a highly-ranked user. As a result, it is possible to encourage users who wish to increase the number of friends to aim at becoming highly-ranked users, and it is possible to provide users with a motivation to continue the game until they become highly-ranked users.

The present invention relates to a game control method executed by a computer including a display which shows a screen in an information processor which logs in a server connected to a plurality of information processors and a memory which stores a relation between user identification information corresponding to a user who plays the game by using a plurality of the information processors and user identification information corresponding to another user who is a friend of the user, and the computer executing the processes of: storing, in the memory, ranking determined based on history of the game of the users, in association with the user identification information;

accepting a rank screen transition request for transition to the rank screen in which a predetermined number of sets of the user identification information of the users ranked at or above a predetermined rank is displayed;

referring to the memory in response to the rank screen transition request and acquiring the user identification information of the highly-ranked users at the ranking;

constructing the rank screen in which each set of the user identification information of the highly-ranked users at the ranking is associated with each friend-request button and displaying the rank screen on the display; and when the friend-request button is operated on the rank screen, accepting the friend request for the user corresponding to that friend-request button from the user who logs in the information processor, and has made the request by the information processor, and shifting to a state that allows these users to become friends.

According to the above arrangement, on the rank screen, users who are highly ranked based on the game history are displayed in association with the friend-request buttons. This makes it easy for users to send a friend request to a highly-ranked user, so that a lot of users would send a friend request to a highly-ranked user. As a result, it is possible to encourage users who wish to increase the number of friends to aim at becoming highly-ranked users, and it is possible to provide users with a motivation to continue the game until they become highly-ranked users.

The present invention improves a possibility of providing motives to continue a game.

BRIEF DESCRIPTION OF THE DRAWINGS

FIG. 6 is an explanatory diagram of a friend information table.

FIG. 7 is an explanatory diagram of a user information table.

FIG. 8 is an explanatory diagram of a rank table.

FIG. 14 is a flowchart of a server process.

DETAILED DESCRIPTION OF THE INVENTION

An information processor of the present invention will be described with reference to figures.

(Outline)

Figure 1:
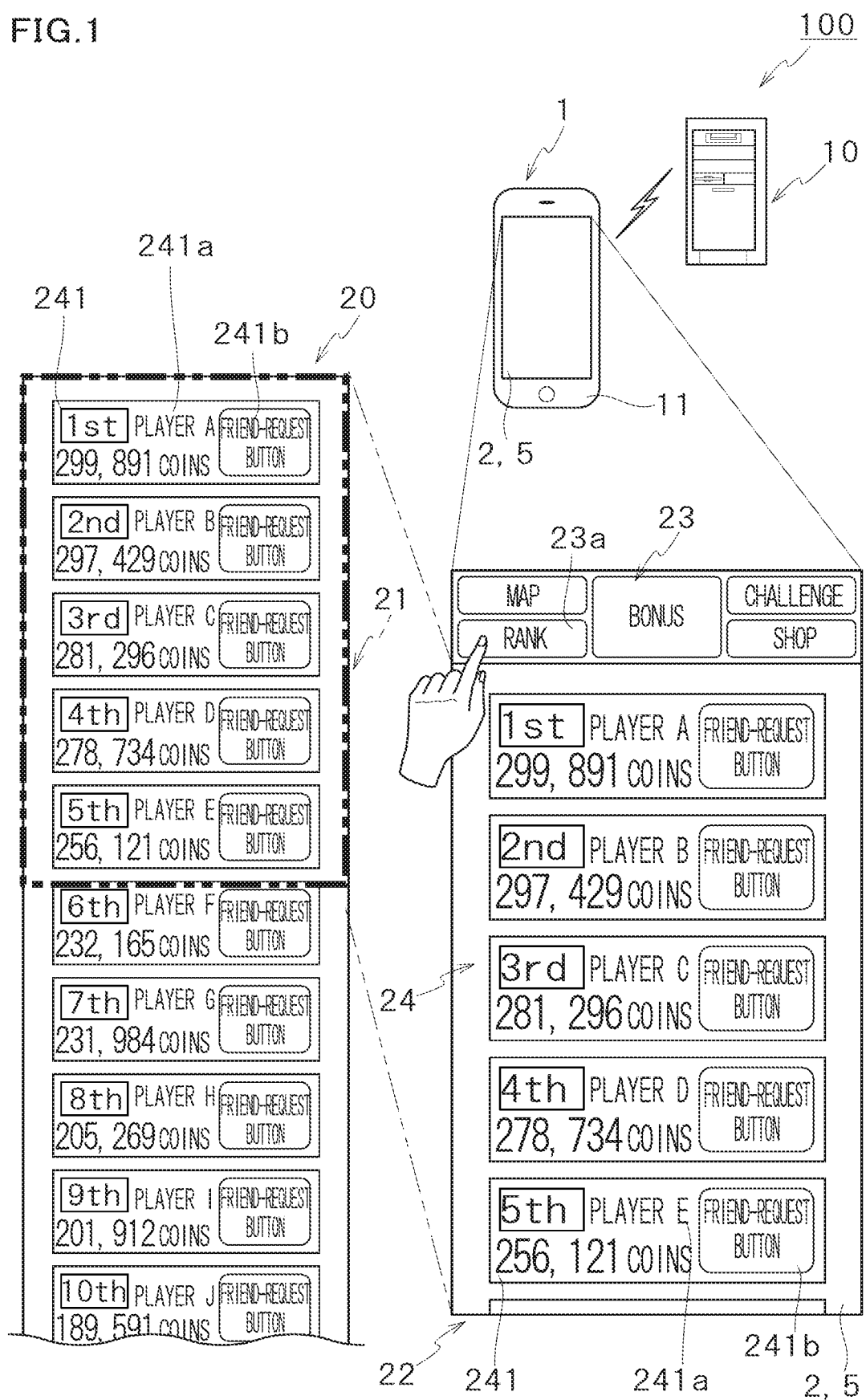
FIG. 1 is an explanatory diagram showing an operation state in the present invention.

As shown in FIG. 1, a game system 100 is configured to allow users to send a friend request to a highly-ranked user on a rank screen displaying the ranking in the game.

The game system 100 includes an information processor 1 and a server 10. The information processor 1 is connected to the server 10 in a data-communicable manner via a communication line. It should be noted that the game system 100 is not limited to this, and the system may be constituted only by the information processor 1.

The following description may be read on the premise that users log in the server 10 via the information processor 1. For example, a user enters his/her user ID and password in the information processor 1, and the server 10 authenticates the information via a communication line. The information processor 1 may store the login information for the login authentication, and a user may automatically log in the server 10 using the stored login information without entering the information at the time of starting the game. The information processor 1 may automatically login the server 10 by biometrics authentication using the stored login information at the time of starting the game. As biometric information used for the biometrics authentication, known ones such as face, fingerprint, retina, iris, vein patterns, voiceprint, and the like can be used. In this manner, the server 10 allows users to log in the information processor 1 and execute the game.

The information processor 1 includes a display 2 provided on the front surface of a housing 11, and a touch panel 5 provided throughout the display 2. The information processor 1 may be a mobile device or a desktop device. Examples of mobile information processor 1 include: portable computers, laptop personal computers, tablet personal computers, hand-held personal computers, PDA (Personal Data Assistant), smartphones and the like.

The display 2 is configured to be able to display images. The display method of the display 2 is, for example, liquid crystal, organic electroluminescence, CRT (Cathode Ray Tube), and plasma. The touch panel 5 makes it possible to detect the coordinates of a part touched by a user's finger or the like. The touch panel 5 adopts an already known technology such as electromagnetic induction and electrostatic capacity. The information processor 1 determines an object on the screen touched by the user, or the state of the touching such as swipe and the like based on coordinates detected by the touch panel 5, and makes a response according to the determination result.

It should be noted that, where the display 2 is viewed from the front, a direction towards the lower end is referred to as "downward" or simply as "down", a direction towards the upper end is referred to as "upward" or simply as "up", a direction towards the left end is referred to as "leftward" or simply as "left", and a direction towards the right end is referred to as "rightward" or simply as "right", in the following description.

Further, in the following description, the expression reading selection or touch input by the user with respect to an object means the information processor 1 determines that an object is selected in relation to the user operation received by the touch panel 5.

Further, in the present embodiment, the touch panel 5 operates as an input device, and accepts a swipe input, a touch input, and the like; however, the present embodiment is not limited to this. For example, a microphone or a camera may be adopted as an input device, and may receive the user's voice or gesture as an instruction input.

As shown in FIG. 1, in the game system 100, a rank screen 22 is displayed on the display 2 of the information processor 1. The rank screen 22 is a screen showing the ranking of the users determined based on the game history of each user. On the rank screen 22, a predetermined number (for example, 1000 persons from the first place to the 1000th place) of sets of the user identification information of users ranked at or above a predetermined rank is displayed. In the following description, users ranked at or above the predetermined rank may be referred to as superior users.

To be more specific, a menu area 23 is displayed on an upper part of the rank screen 22. On the rank screen 22, the entirety of an area below the menu area 23 is a rank display area 24.

The menu area 23 is not limited to the rank screen 22 and may be provided also in other screens. In the menu area 23, a rank screen transit button 23a is provided. The rank screen transit button 23a is an object used for transition to the rank screen 22 by touch input. That is to say, the information processor 1 accepts a demand for transiting to the rank screen 22 when a touch input is made to the rank screen transit button 23a. Transition to the rank screen 22 is not limited to this.

When a screen transition is made to the rank screen 22, superior user data 20 indicating all superior users displayable in the rank display area 24 of the rank screen 22 is constructed in the later-described memory 3. In the present embodiment, the superior user data 20 indicates how the areas corresponding to the respective superior users displayed on the rank screen 22 are arranged.

To be more specific, the superior user data 20 shows a plurality of user areas 241 which are lined up in the vertical direction and correspond to the respective superior users. In each user area 241, user identification information 241a and a friend-request button 241b are shown. The user identification information 241a is, for example, an image showing the user identification information corresponding to each user. For example, the user identification information corresponds to a user name, avatar, login ID, etc., and may not be unique to each user. The friend-request button 241b is an object for sending a friend request to the user corresponding to the user identification information 241a. As described above, in the superior user data 20, each set of superior user identification information is associated with the friend-request button 241b, and on the rank screen 22, each set of superior user identification information is displayed in association with the friend-request button 241b.

The superior user data 20 includes rank display areas 24 for a plurality of screens. Before the rank screen 22 is displayed, a display area 21 which corresponds to the size of the rank display area 24 is set in the superior user data 20, and a part of the superior user data 20 included in the display area 21 is displayed in the rank display area 24. That is, only users corresponding to the item areas 241 included in the display area 21 are displayed in a single rank screen 22, among the users included in the superior user data 20.

As described above, on the rank screen 22, users who are highly ranked based on the game history are displayed in association with the friend-request buttons 241b. This makes it easy for users to send a friend request to a highly-ranked user, so that a lot of users would send a friend request to a highly-ranked user. As a result, it is possible to encourage users who wish to increase the number of friends to aim at becoming highly-ranked users, and it is possible to provide users with a motivation to continue the game until they become highly-ranked users.

In the present embodiment, a user has a higher ranking when he/she obtains a larger number of acquisitions in the game during a period (e.g., 1 week). Specifically, the number of acquisitions corresponds to the number of coins that can be awarded as a result of a slot game executable as a game element in the game (hereinafter, such coins may be simply referred to as coins). The coins are used as substitutes for credits in the game, and are used for betting as a condition to execute the slot game. That is, a user plays the slot game by betting coins, and the rank is set based on a cumulative total of coins acquired as a result of the slot game within a predetermined period.

The method of setting the ranking is not limited to this, and, for example, the rank may be set based on the number of coins calculated by subtracting the coins used as the start condition of the slot game from the acquired coins. Further, plural types of slot games may be executable as game elements, and the ranking may be determined for each type of the slot game. In other words, plural types of the superior user data 20 may be constructed. Furthermore, the rank screen 22 is not limited to one type, and plural types of screens may be provided in such a manner that a transition from one screen to another is possible.

The user identification information is not limited to the information displayed as the user identification information 241a. For example, the user identification information includes a user ID which is unique to a user, and is associated with a user name, an avatar image, or the like, which is displayed as the user identification information 241a.

Figure 2:
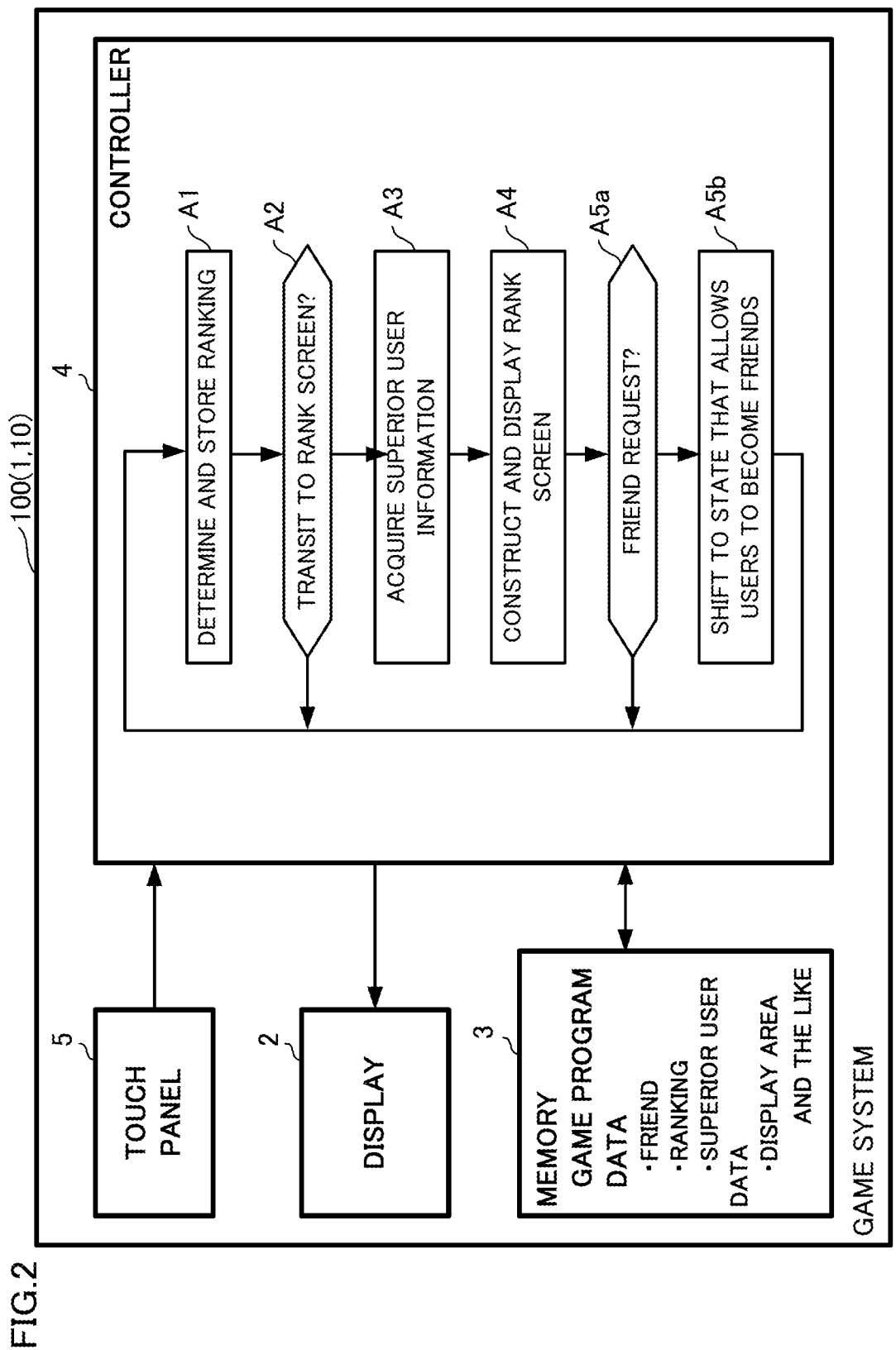
FIG. 2 is an explanatory diagram showing a schematic structure in the present invention.

As shown in FIG. 2, the game system 100 includes the information processor 1 and the server 10 each of which is a computer, the display 2, the memory 3, the controller 4, and the touch panel 5.

The display 2 and the touch panel 5 are provided in the information processor 1, and function as an output device and an input device in the game system 100, respectively.

The memory 3 stores various programs including a game program executed by the controller 4 and various data used in the various programs. The memory 3 is a conceptual storage area in the game system 100, which may be implemented either in the information processor 1 or in the server 10. Alternatively, the function of the memory 3 may be separately implemented in the information processor 1 and the server 10, or the function of the memory 3 may be implemented both in the information processor 1 and the server 10. That is, in the game program executed in the information processor 1, if data stored in the server 10 is necessary, the information processor 1 requests the data to the server 10, and the server 10 responds to such a request of data.

The data and program in the memory 3 may be stored in advance at the stage of factory shipment, or may be downloaded from an unillustrated server or the like via communication means and stored. The communication means may be an interactive communication passage such as the Internet and a cable TV, or may be one-way broadcasting.

Further, the data and programs to be stored in the memory 3 may be stored in a storage medium such as a floppy disc, CD-ROM, DVD-ROM, MO (Magneto-Optical Disc), a flash memory, and may be read out from such a storage medium as needed and installed in the memory 3.

The controller 4 executes various processing according to the game program stored in the memory 3. The controller 4 is a conceptual execution device in the game system 100, which may be implemented either in the information processor 1 or in the server 10. Alternatively, the function of the controller 4 may be separately implemented in the information processor 1 and the server 10, or the function of the controller 4 may be implemented both in the information processor 1 and the server 10.

As described, the game system 100 functions as a single computer including the information processor 1 having the input device (touch panel 5) and an output device (display 2), and the information processor 1 and/or a server 10 serving as the memory 3 and the controller 4.

The memory 3 stores, for example, the following sets of data. That is, the memory 3 stores a relation between the user identification information corresponding to a user who plays the game by using plural information processors 1 and the user identification information corresponding to another user who is a friend of the user. In the present embodiment, the user identification information is a user ID and a user name which is displayed as the user identification information 241a. The memory 3 stores the ranking determined based on the game history of plural users in association with the user identification information. The memory 3 stores the superior user data 20 which configures a rank screen in which sets of the superior user identification information are associated with the respective friend-request buttons 241b, and the display area 21 which indicates an area in the superior user data 20, which is to be displayed in the rank display area 24.

The controller 4 is programmed to execute the processes as described below. In other words, the game program stored in the memory 3 causes the game system 100 as the computer to execute the processes described below. Specifically, the controller 4 executes the processes of: storing, in the memory 3, the ranking determined based on the game history of plural users, in association with the user identification information (A1); accepting a rank screen transition request for transition to the rank screen in which a predetermined number of sets of the user identification information of the users ranked at or above a predetermined rank is displayed (A2); acquiring the superior user identification information in response to the rank screen transition request, with reference to the memory 3 (A3); constructing the superior user data 20 in which each set of superior user identification information is associated with each friend-request button 241b, and displaying the data as the rank screen 22 (the rank display area 24) on the display (A4); and when a friend-request button 241b is operated on the rank screen 22 (A5a), accepting a friend request for the user corresponding to that friend-request button 241b from the user who has made the request by the information processor 1; and shifting to a state that allows these users to become friends (A5b).

As described above, on the rank screen 22, users who are highly ranked based on the game history are displayed in association with the friend-request buttons 24b. This makes it easy for users to send a friend request to a highly-ranked user, so that a lot of users would send a friend request to a highly-ranked user. As a result, it is possible to encourage users who wish to increase the number of friends to aim at becoming highly-ranked users, and it is possible to provide users with a motivation to continue the game until they become highly-ranked users.

In addition to the above, as the game system 100 including the program above executes the processes (A1) to (A5), a game control method in which the processes (A1) to (A5) are executed by the game system 100 (computer) is embodied. In other words, the game system 100 includes a plurality of processing units configured to execute the processes (A1) to (A5), respectively. While the descriptions below deal with the game system 100 including the information processor 1 and the server 10, processes and operations of the information processor 1 can be interpreted as those of a program or a game control method. Further, the processes executed by the controller 4 may be executed only in the information processor 1, or only a function as the database may be implemented in the server 10. That is, the processes and operations of the game system 100 may be paraphrased as an invention of the information processor 1.

The controller 4 in the game system 100 may further execute a processes of: outputting the number of acquisitions in accordance with a result of the game; determining ranking according to the cumulative number of acquisitions; and making friends associated with the user advantageous when the number of acquisitions of the user satisfies a predetermined condition.

In this way, ranking is determined by the cumulative number of acquisitions outputted as a result of the game, and when the number of acquisitions outputted is equal to or larger than a threshold, friends of the user who outputs the specified number of acquisitions are made advantageous. Since the cumulative number of acquisitions of a highly-ranked user is larger than that of other users, it is recognized that such a user is likely to output the number of acquisitions that satisfies the predetermined condition. For this reason, and the higher a user is ranked, the more friend-requests he or she is likely to receive. As a result, it is possible to encourage users who wish to increase the number of friends to aim at becoming highly-ranked users.

In the game system 100 of the present invention, the controller 4 is programmed to execute the processes of: cumulatively storing points corresponding to the number of acquisitions of each user; when the number of acquisitions of a user satisfies a predetermined condition, awarding a point to a friend associated with that user; and awarding an item for making the game advantageous to the user, when the points corresponding to the user reach a predetermined number.

In this way, when a user outputs the number of acquisitions which satisfies a condition in the game, not only that user but also friends associated with that user acquire points corresponding to the number of acquisitions. The points are cumulatively stored for each user, and a user whose points reach a predetermined number acquires the item which makes the game advantageous. Users recognize that highly-ranked users output a large number of acquisitions, and as the ranking is higher, the user may get more friend-requests from other users who expects POINTS from the friends. As a result, it is possible to encourage users who wish to increase the number of friends to aim at becoming highly-ranked users.

In the present embodiment, the number of acquisitions indicates the number of coins to be awarded according to a play result of a slot game. In addition, the predetermined condition means that the awarded coins have a payout scale larger than a normal payout scale. It should be noted that the payout scale may be determined based on whether or not the number of awarded coins exceed a reference threshold, or whether or not the ratio of the number of awarded coins to the number of betted coins exceed a reference ratio.

Further, the item indicates all items used in the game. For example, the items include coins, a usable item which makes the slot game advantageous, and "in-game currency" exchangeable with these items.

In addition, "a state that allows users to become friends" means that a user who has sent a friend-request to another user who is a target of a friend-request is in a state of waiting for a response from the another user. In the present embodiment, the controller 4 inquires of the friend-request target user whether to accept the friend-request, and when the friend-request target user accepts the request, the memory 3 associates the user identification information of the user who has sent the friend-request with the user identification information of the friend-request target user. When the friend-request target user refuses the request, "a state that allows users to become friends" is canceled, and a state before "a state that allows users to become friends" is reinstated. Incidentally, when the friend-request target user blocks the requested user, shifting to "a state that allows users to become friends" may be prohibited from this time forward.

(Electrical Structure)

Figure 3:
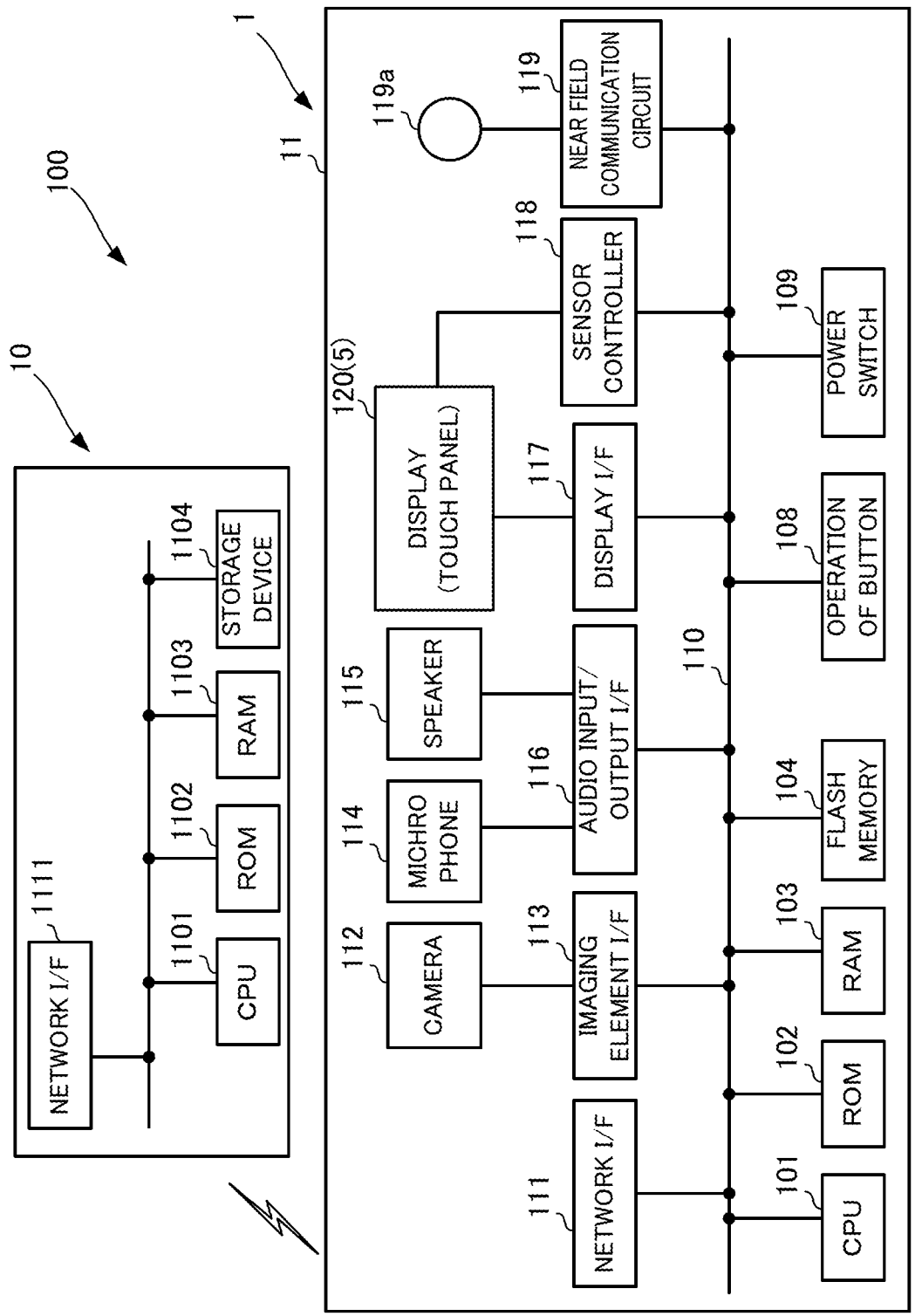
FIG. 3 is a block diagram showing an electric structure of an information processor.

As shown in FIG. 3, the information processor 1 includes, in the housing 11, a CPU 101, a ROM 102, a RAM 103, a flash memory 104, an operation button 108, a power switch 109, a bus line 110, a network I/F 111, a camera 112, an imaging element I/F 113, a microphone 114, a speaker 115, a sound input/output I/F 116, a display I/F 117, a sensor controller 118, a near field communication circuit 119, and an antenna 119a of the near field communication circuit 119.

Further, the server 10 is a so-called computer including a CPU 1101, a ROM 1102, a RAM 1103, a storage device 1104 such as a hard disk drive and the like, and a network I/F 1111.

The CPU (Central Processing Unit) 101, and the CPU 1101 function as a main structure of the controller 4, and control the entire operation of the game system 100. The ROM (Read Only Memory) 102 and the ROM 1102 store programs used for driving the CPU 101 and CPU 1101, such as an IPL (Initial Program Loader).

The RAM (Random Access Memory) 103 and the RAM 1103 are used as a work area of the CPU 101 and the CPU 1101. The flash memory 104 stores the game program, a program for communication, and plural sets of data such as image data and sound data. The operation button 108 is used for, for example, initial setting of the information processor 1. The power switch 109 is used for turning on/off the power source of the information processor 1.

The storage device 1104 functions as a database, and stores game data of each of the plurality of information processor 1. In response to a request from the game program in the information processor 1, the server 10 returns as needed a response referring to the database in the storage device 1104.

The network I/F (Interface) 111 and the network I/F 1111 are each an interface for data communications using a communication network such as the internet. The camera 112 is a built-in camera image capturing means which captures an image of an object to obtain image data under the control of the CPU 101. The imaging element I/F 113 is a circuit for controlling the camera 112. The microphone 114 is a built-in sound collection means to which sound is input. The sound input/output I/F 116 is a circuit for processing input and output of a sound signal between the microphone 114 and the speaker 115 under the control of the CPU 101. The display I/F 117 is a circuit for sending image data to the display 2 under the control of the CPU 101. The display 2 is provided on the front surface of the housing 11. The sensor controller 118 is a circuit for receiving an input from the touch panel 5 of the display 2. The near field communication circuit 119 is a communication circuit based on NFC (Near Field Communication) (Registered Trademark). Bluetooth (Registered Trademark), or the like. The bus line 110 is an address bus, a data bus, or the like for electrically connecting the components such as the CPU 101.

In the present embodiment, the functions of the memory 3 and the controller 4 are distributed to the information processor 1 and the server 10 as follows. Specifically, the user identification information, the relation between sets of the user identification information indicating friendship, and the ranking of the users are stored in the database of the storage device 1104 in the server 10. When the information processor 1 accepts an operation of a user to make a transition to the rank screen 22, the information processor 1 requests the server 10 to send ranking information of highly-ranked users, and obtains the information as a response from the server 10. That is, the server 10 acquires the user identification information of the highly-ranked users. The information processor 1 temporarily stores the ranking information of the highly-ranked users in the RAM 103 and the like. The information processor 1 constructs the superior user data 20 in which each set of superior user identification information is associated with each friend-request button 241*b* based on the ranking information of the highly-ranked users, sets the display area 21, and displays the rank screen 22. Then, when the information processor 1 accepts an operation to the friend-request button 241*b*, the information processor 1 transmits, to the server 10, a signal indicating the user identification information of the user who has sent the friend-request and the user identification information of the friend-request target user. When the server 10 receives the signal, shift to a state in which these users are allowed to be friends occurs.

The disclosure is not limited to this arrangement, and for example, the server 10 may construct the superior user data 20, and transmit the data to the information processor 1. That is, the information processor 1 may receive the superior user data 20 in which each set of superior user identification information is associated with each friend-request button 241*b*. On the basis of this, the information processor 1 may display the rank screen 22 on the display 2 as a response to the server 10.

(Display Screen)

Next, the following specifically describes a display screen related to the rank screen 22 displayed on the information processor 1.

Figure 4:
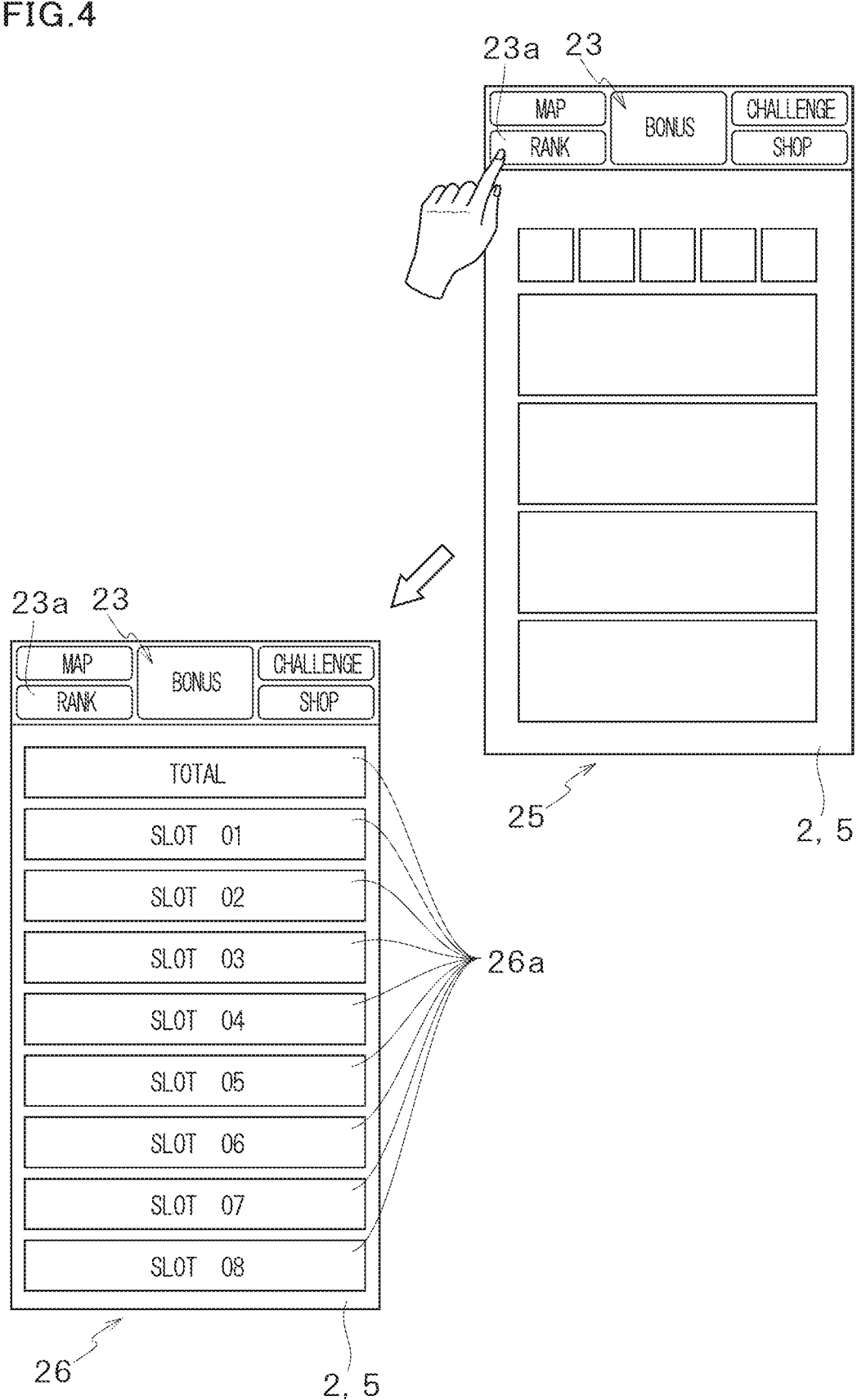
FIG. 4 is a diagram showing an example display screen on the information processor.

As shown in FIG. 4, in a predetermined screen 25, when a touch input is made to the rank screen transit button 23*a* in the menu area 23, a rank selection screen 26 is displayed. On the rank selection screen 26, a plurality of rank target selection buttons 26*a* are displayed. That is, plural types of the rank screens 22 are displayed. In the present embodiment, plural types of slot games are playable as game elements, and the rank screen 22 is displayed for each type. That is, in the memory 3, the cumulative number of coins for determining the ranking is stored in association with each type of the slot game. In addition, an overall rank screen 22 of the slot games is displayed. That is, on the overall rank screen 22, ranking of the users determined by the cumulative number of coins acquired in all kinds of slot games is displayed. On the rank selection screen 26, when a touch input is made to any of the rank target selection button 26*a*, the rank screen 22 corresponding to the rank target selection button 26*a* is displayed.

Figure 5:
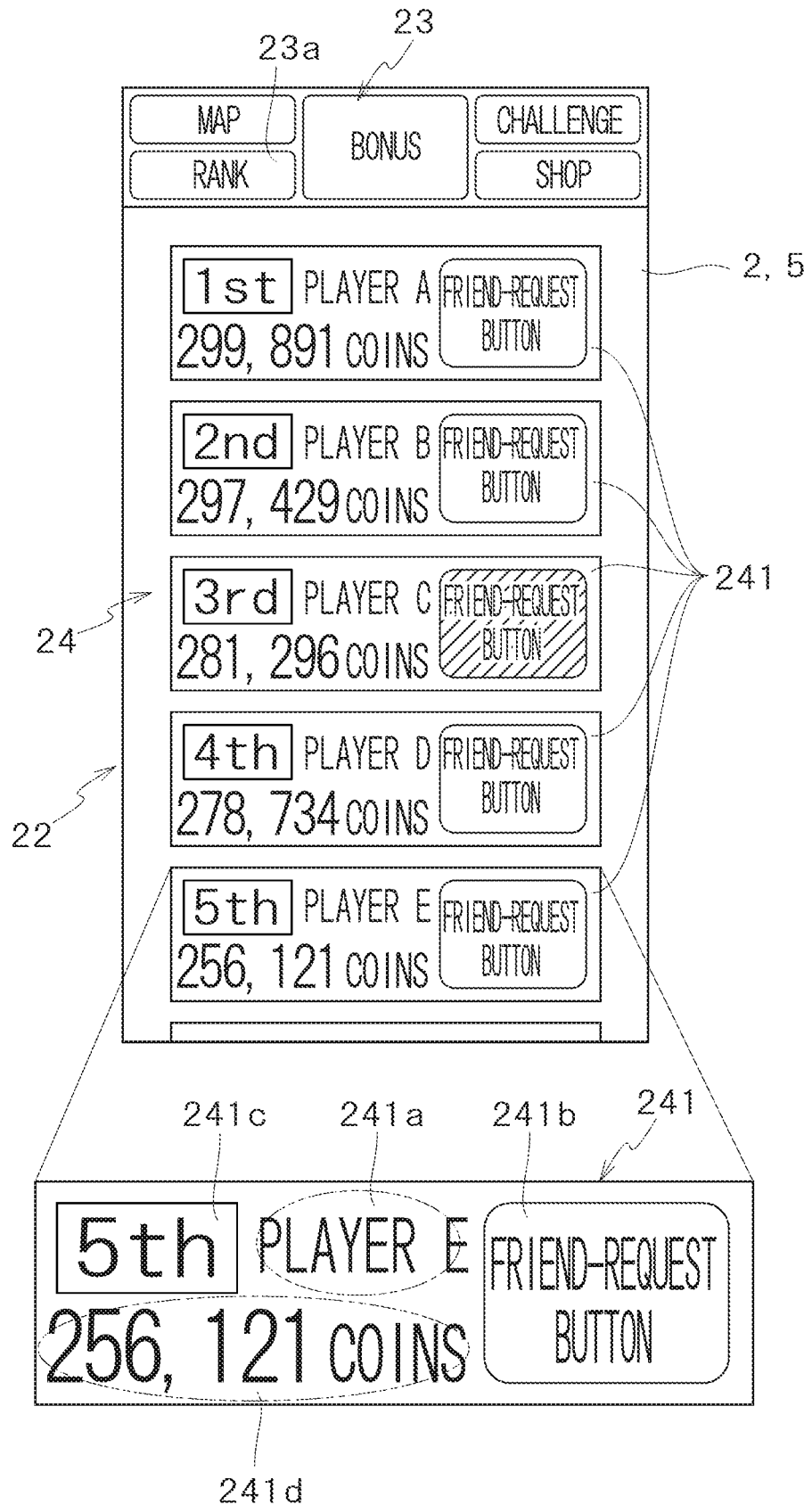
FIG. 5 is a diagram showing an example display screen on the information processor.

As shown in FIG. 5, and as mentioned hereinabove, the rank screen 22 is provided with the menu area 23 in the upper portion, and the rank display area 24 throughout the entire portion below the menu area 23.

In the rank display area 24, a plurality of user areas 241 indicating the respective superior users are aligned in the vertical direction. In each user area 241, user identification information 241*a* and a friend-request button 241*b* are associated with each other. Further, in the user area 241, a rank display area 241*c* which shows the rank of a user indicated in the user identification information 241*a*, and the number of acquisitions area 242*d* which shows the number of acquisitions (the number of coins) within a predetermined period by the user indicated in the user identification information 241*a* are provided.

The friend-request button 241*b* is an object selectable for a friend request to a user indicated in the user identification information 241*a*, and is configured to accept a touch input by a user. As shown in FIG. 5, when the relationship with a user indicated in the user identification information 241*a* is a specific relationship, the friend-request button 241*b* may be grayed out so as not to accept a touch input from a user. Referring to a later-described friend information table (FIG. 6), this specific relationship with a user will be described.

(Data Table)

The following describes data tables stored in the storage device 1104 of the server 10.

Friend Information Table

As shown in FIG. 6, a friend information table includes a user column, a friend target column, and a status column. In the user column and the friend target column, user IDs of users who play the game using the information processor 1 are stored. In the status column, a friend state showing a relation between a user (subject user) stored in the user column and a user (object user) stored in the friend target column of the subject user is stored.

The friend state is, for example, a befriended state, an approval-waiting state, a block state, or blocked state. The befriended state shows that a subject user and an object user are friends. The approval-waiting state is a state in which a subject user has sent a friend request to an object user. That is, the approval-waiting state is a state in which a subject user and an object user are allowed to be friends. The block state is a state in which a subject user rejects being friends with an object user. The blocked state is a state that an object user rejects being friends with a subject user.

In the present embodiment, when an object user included in the friend information table is a superior user, the friend-request button 241*b* of that user is not displayed. That is, with the assumption that a user who uses the information processor 1 and displays the rank screen 22 is the subject user and a user indicated in the user identification information 241*a* of the user area 241 is the object user, the state column of the friend information table is referred to, and it is determined whether the friend-request button 241*b* is grayed out or not.

It should be noted that the present disclosure is not limited to the grayed-out display, and when a touch input is made to the user identification information 241*a* and if the relationship between the user having made the touch input and a user corresponding to the user identification information 241*a* is in any of the befriended state, the approval-waiting state, the block state, or the blocked state, a pop-up notification which notifies any of these states may be displayed.

User Information Table

As shown in FIG. 7, a user information table includes a user column, a user name column, an acquisition-coin-number column, and a point-number column. The acquisition-coin-number column further includes a game type column for each type of playable game, and a total column.

In the user column, user IDs of users who play the game using the information processor 1 are stored. In the user name column, user names which are set by the respective users are stored. In this way, the user name is the user identification information associated with the user ID. In the acquisition-coin-number column, the current cumulative number of coins within a predetermined period is stored for each game type in the game type column, and the total number of coins is stored in the total column. That is, the current number of coins in the acquisition-coin-number column is accumulatively increased based on game play by users. The point-number column stores points which are acquired according to the number of acquisitions in the slot game and accumulated. Points are awarded also when the number of acquisitions a user in the friend state acquires in the slot game satisfies a predetermined condition.

(Rank Table)

As shown in FIG. 8, a rank table includes a rank column, a user column, a user name column, and an acquisition-coin-number column. In the rank column, a ranking of users is stored. In the user column, user IDs of users who play the game using the information processor 1 are stored. In the acquisition-coin-number column, the total number of coins that each user has acquired in a specified game element is stored.

The rank table is a table in which information for displaying the rank screen 22 is totaled up based on the user information table. That is, a plurality of the ranking tables are prepared corresponding to the types of the displayable rank screens 22. In FIG. 8, only the rank table of one game element (slot game 01) corresponding to one rank screen 22 is shown.

In the present embodiment, the rank table is updated at predetermined intervals. That is, the server 10 sequentially updates the user information table based on information of the number of acquisitions (the number of acquired coins) supplied from a plurality of the information processors 1, and updates the rank table based on the user information table at predetermined intervals.

(Slot Game)

As described above, rank is determined according to the number of coins acquired in plural types of the slot games generated as the game elements in the game. It should be noted that the game element is not limited to this, and may be a card game such as poker and baccarat, a roulette game, a pachinko game, a pachinko slot game, and the like.

Figure 9:
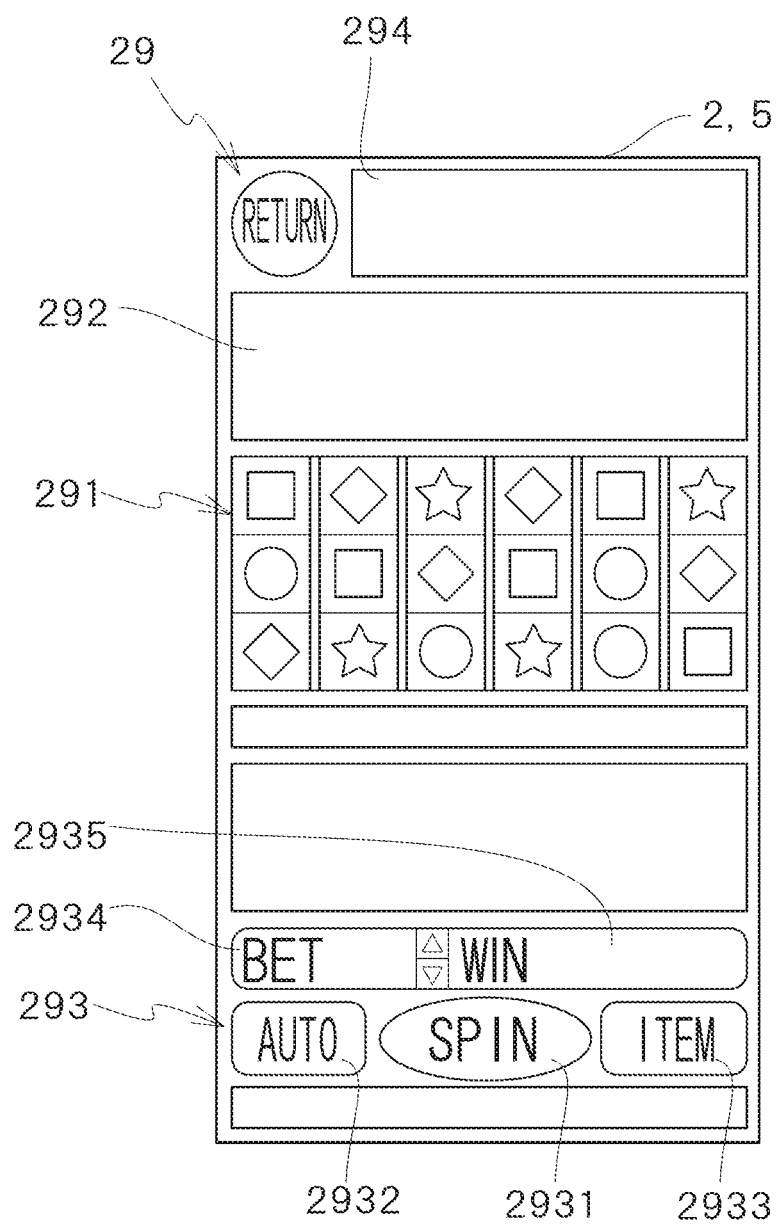
FIG. 9 is a diagram showing an example display screen on the information processor.

As shown in FIG. 9, a slot game screen 29 in which the slot game is run includes a game area 291 where symbol display areas are displayed to form plural rows and columns, an effect area 292 where moving images and still images such as game characters are displayed in accordance with the slot game, an operation area 293 which is operated by the user to progress the game, and a game information display area 294 which displays game contents and game information. The operation area 293 includes a spin button 2931, an AUTO button 2932, an ITEM button 2933, a bet button 2934, and a WIN display portion 2935, which are images.

As hereinabove-described, on the entire surface of the display 2, a touch panel 5 which allows the game screen to be viewable from the outside is provided. With this arrangement, for example, the slot game (unit game) is executed once, upon a touch input of the image of the spin button 2931. Furthermore, the slot game is serially executed plural times as the image of the AUTO button 2932 is pressed.

(Slot Game: Definition)

The base game in the slot game of the present embodiment is a game in which plural symbols are displayed (arranged) by being varied and stopped in the game area 291, and includes a normal game. A state in which a symbol is displayed after being varied and stopped in the game area 291 is termed "rearrangement". As a bonus game, the free game is executed at least once in the slot game. The slot game may include a process of executing a free game where symbols are rearranged on condition that the payout rate is higher than the payout rate in the normal game and a bonus payout is awarded in accordance with the rearranged symbols.

A gaming value which is awarded when a prize is established as a result of a game result is a coin, paper money, or electrically valuable information corresponding to these. Note that the gaming value in the present invention is not particularly limited. Examples of the gaming value include game media such as medals, tokens, electronic money, tickets, and the like. A ticket is not particularly limited, and a barcoded ticket may be adopted for example. Alternatively, the gaming value may be a game point not including valuable information.

The free game is a game which is executable with a smaller amount of gaming values bet than in the normal game. Note that "bet of smaller amounts of gaming values" encompasses a bet of zero gaming value. The "free game" therefore may be a game runnable without a bet of a gaming value, which free game awards an amount of gaming values based on symbols rearranged. In other words, the "free game" may be a game which is started without consumption of a gaming value. To the contrary, the "normal game" is a game runnable on condition that a gaming value is bet, which normal game awards an amount of gaming value based on the symbols rearranged. In other words, the "normal game" is a game which starts with consumption of a gaming value.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

A state in which a symbol is displayed after being varied and stopped in the game area 291 is termed "rearrangement". To put it differently, the term "rearrangement" indicates that the symbols are rearranged after the arrangement of the symbols is dismissed. "Arrangement" means a state where the symbols can be visibly confirmed by the user.

(Information Processor 1: Example of Slot Game: Functional Blocks)

Figure 10:
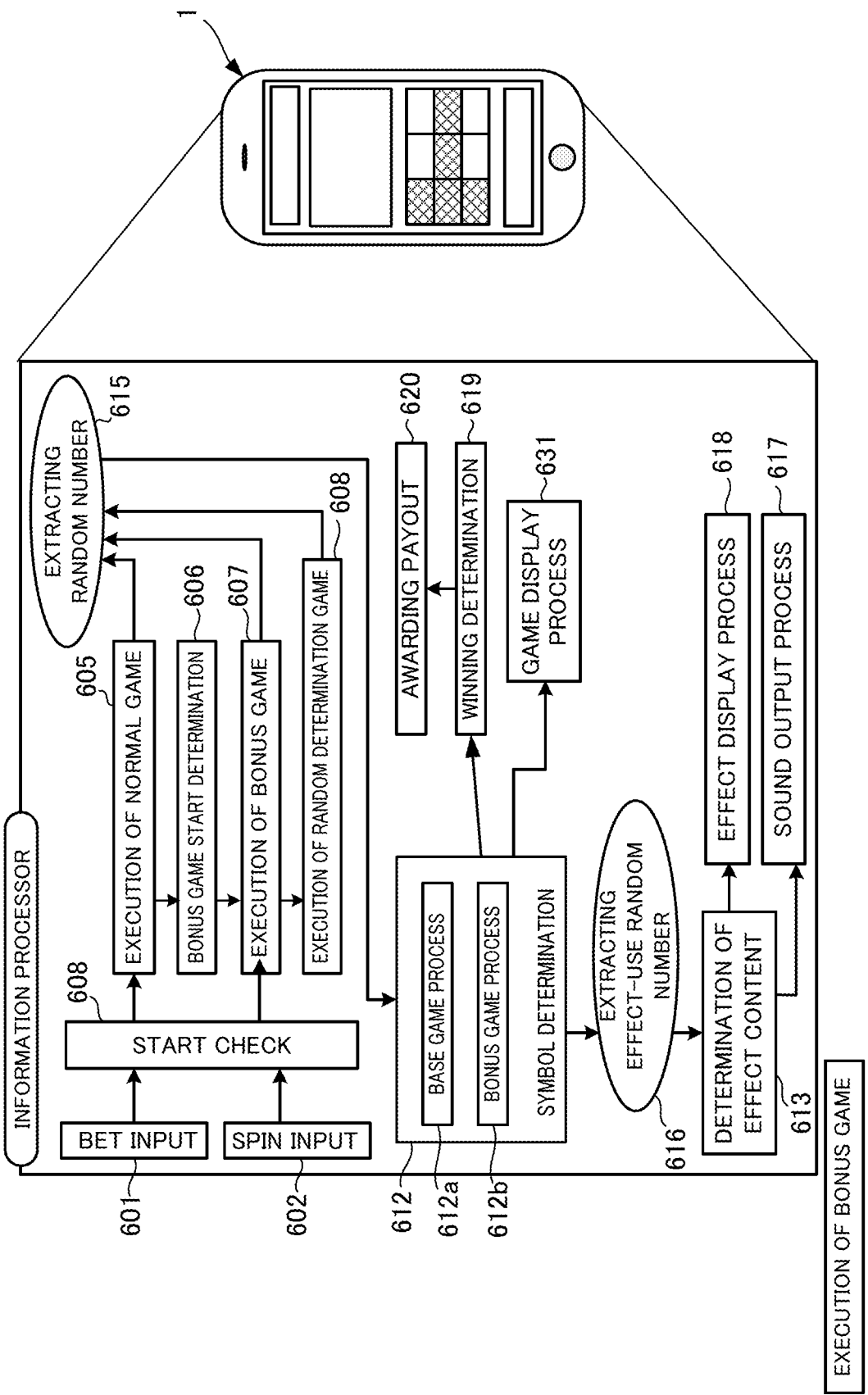
FIG. 10 is a functional block diagram of the information processor.

As shown in FIG. 10, the information processor 1 which is a gaming machine running the slot game has the following functions. To be more specific, the information processor 1 includes a BET input unit 601 and a spin input unit 602. The BET input unit 601 and the spin input unit 602 are input devices. The BET input unit 601 has a function of receiving a bet in response to a user operation. The spin input unit 602 has a function of receiving a user operation, i.e., an instruction to start a game.

The information processor 1 includes a start check unit 603, a normal game running unit 605, a bonus game start determining unit 606, a bonus game running unit 607, a random determination game running unit 608, a random number sampling unit 615, a symbol determining unit 612, an effect-use random number sampling unit 616, an effect determining unit 613, a sound output unit 617, an effect display processing unit 618, a winning determining unit 619, a prize awarding unit 620, and a game display processing unit 631.

The normal game running unit 605 has a function of running a normal game which is a base game, on condition that the BET input unit 601 is operated. The bonus game start determining unit 606 determines whether to run a bonus game, based on a combination of the symbols rearranged in the normal game. In other words, the bonus game start determining unit 606 has functions of: determining that the player is entitled to a bonus game when a bonus symbol is rearranged; and activating the bonus game running unit 607 so as to run a bonus game from the subsequent unit game. The random determination game running unit 608 has a function of randomly determining prizes including the bonus game. As this function is executed after the execution by the bonus game running unit 607, the bonus game can be repeatedly run.

The symbol determining unit 612 includes a base game processing unit 612a and a bonus game processing unit 612b. The symbol determining unit 612 including these processing units 612a and 612b has functions of: determining symbols to be rearranged based on a random number given from the random number sampling unit 615; rearranging the determined symbols in the game area 291 of the display 2; outputting rearrangement information of the symbols to the winning determining unit 619; and outputting an effect instruction signal to the effect-use random number sampling unit 616, based on the combination of the rearranged symbols.

The effect-use random number sampling unit 616 has a function of sampling an effect random number when receiving an effect instruction signal from the symbol determining unit 612 and a function of outputting the effect-use random number to the effect content determining unit 613. The effect content determining unit 613 has functions of: determining an effect content by using the effect-use random number; outputting image information on the determined effect content to the effect display processing unit 618; and outputting audio and illumination information of the determined effect content to the sound output unit 617.

The winning determining unit 619 has functions of: determining whether a winning is achieved based on a combination of symbols when rearrangement information of the symbols is given; calculating an amount of payout based on a winning combination formed when it is determined that a winning has been achieved; and outputting, to the prize awarding unit 620, a payout signal which is based on the payout amount. The prize awarding unit 620 has a function of paying out a gaming value to the user. Though not shown, the outputted contents by each of the above processing units are suitably transmitted to the server 10 connected via a communication line.

(Information Processor 1: Example Slot Game: Game Content)

As the slot game, the information processor 1 has three game modes, namely the base game mode, the bonus game mode, and the random determination game mode. The base game mode is a game state during the normal game, whereas the bonus game mode is equivalent to a game state in the free game. The information processor 1 shifts to the bonus game mode when the unit game is run in the base game mode and a bonus trigger condition is satisfied in the base game mode. The trigger of the bonus game is, for example, a condition in which three or more bonus symbols consecutively appear (are rearranged) from the first reel. The trigger of the bonus game may be another condition.

(Information Processor 1: Example Slot Game: Base Game Mode)

The base game mode is specifically described. In the game area 291 displayed on the display 2 shown in FIG. 9, symbols for the slot game are rearrangeable on the video reels with three rows and six columns. In a betting process, a bet amount is selected by the user. The bet amount is, for example, selected from numbers such as 1, 2, 3, 5, and 10 by operating the bet button 2934, or an input of a desirable number may be enabled. The resource generated by accumulating parts of bet amounts is termed jackpot.

Thereafter, in the game area 291, as the symbols are rearranged by varying (scroll-moving) and stopping (scroll-stop) the video reels, whether winning is achieved is determined. Then win determination is performed based on the state of the rearranged symbols. For example, the bonus game trigger is won when the bonus symbols are consecutively rearranged from the first column area (first reel) to the sixth column area (sixth reel). The bonus game trigger is also established when the bonus symbols and a wild symbol which is able to substitute for the bonus symbol are consecutively rearranged.

(Information Processor 1: Example Slot Game: Bonus Game Mode)

The base game mode shifts to the bonus game mode when the trigger condition of the bonus game is established, and a free game process is executed, to begin with.

In the free game process, free game reel strips used in the free game are determined, and a predetermined number of times of execution of the free game is set. The reel strips for the free game and the number of times of execution of the free game may be randomly chosen from plural selected options.

As the free game is run, win determination is executed. This win determination may be identical with the win determination in the base game. For example, when three or more bonus symbols consecutively appear from the first reel, the retrigger condition of the bonus game (free game) is established.

Thereafter, whether the free game ends is determined. If the free game has not ended (i.e., free game is continued), the free game is run for the remaining number of times.

(Information Processor 1: Operation)

Figure 11:
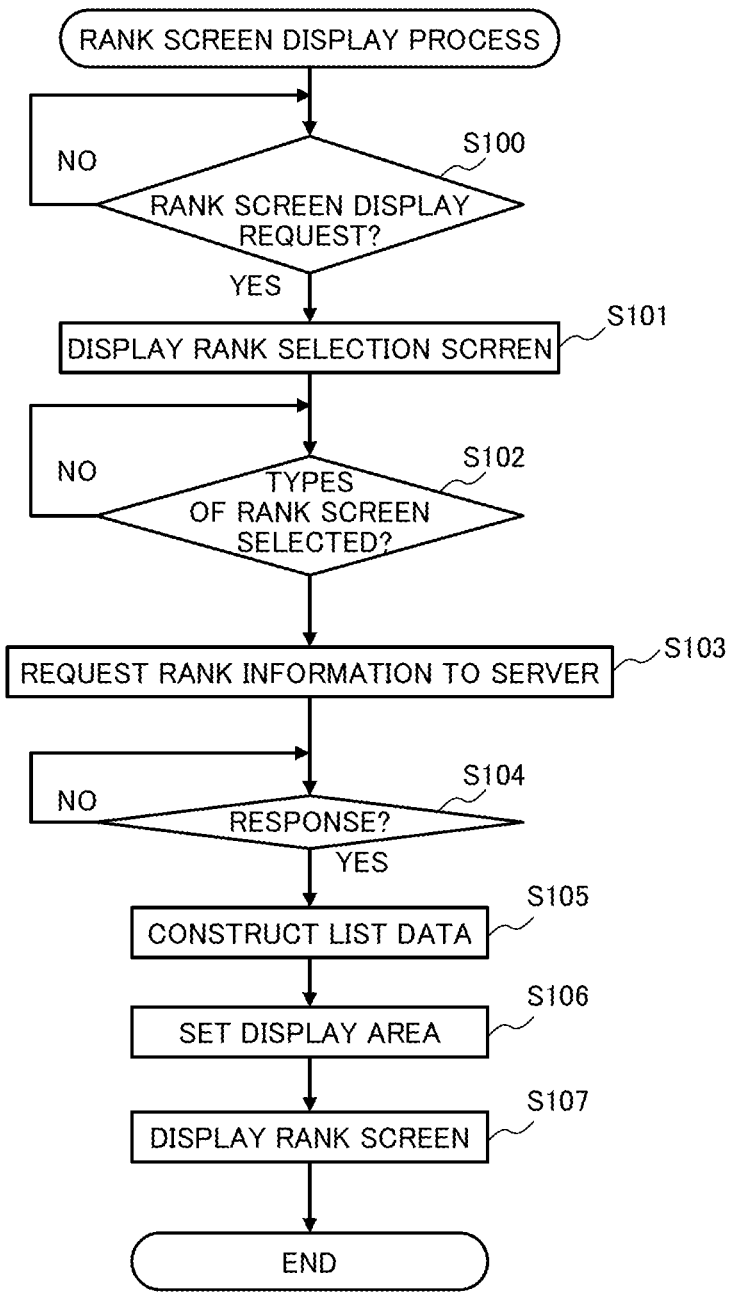
FIG. 11 is a flowchart of an rank screen display process.

Next, with reference to FIG. 11, the following describes a game program in relation to an rank screen display process executed by the CPU 101 of the information processor 1.

As shown in FIG. 11, the CPU 101 first determines if there is a request for displaying the rank screen 22 (S100). For example, such a request occurs when a touch input is performed to a button in a screen other than the rank screen 22, which causes a transition to the rank screen 22. If the request for displaying the rank screen 22 is not received (S100: NO), the CPU 101 repeats the step S100 and waits for the request.

If a request for displaying the rank screen 22 is received (S100: Yes), the CPU 101 displays the rank selection screen 26 (S101). Then, the CPU 101 determines if any type of the slot games as game elements or the overall rank screen, for which the rank screen 22 is to be displayed, is selected (S102). If no selection has been made (S102: NO), the CPU 101 repeats the S102 and waits for the selection.

On the other hand, if the selection has been made (S102: YES), the CPU 101 transmits the user ID and the type of the rank screen 22 to be displayed to the server 10, and requests the rank information (S103).

Then, the CPU 101 determines if there was a response from the server 10 (S104). If no response is received (S104: NO), the CPU 101 repeats the step S104 and waits for a response from the server 10. On the other hand, if there was a response from the server 10 (S104: YES), the CPU 101 constructs the superior user data 20 based on the rank information (S105).

Here, when the request in the step S103 has been made in the information processor 1, the server 10 refers to the rank table, and acquires information (rank, user ID, user name, and the number of acquired coins) of the superior users. Further, the server 10 refers to the friend information table, and, if any, acquires friend information (a relation with a friend target) related to the user corresponding to the information processor 1 which has sent the request. Then, the server 10 returns the information of the superior users and the friend information to the information processor 1 as a response. That is, the rank information indicates the information of the superior users and the friend information.

Specifically, in the step S105, the CPU 101 in the information processor 1 constructs the user areas 241 corresponding to the information of the superior users based on the information from the server 10. Further, the CPU 101 in the information processors 1 determines how the friend-request button 241*b* is displayed in the user area 241, based on the friend information. That is, when a user indicated in the friend target column of the friend information table is included in the superior users, the friend-request button 241*b* of the user is grayed out.

Then, the CPU 101 sets the display area 21 in the constructed superior user data 20 (S106), displays the rank screen 22 based on the constructed superior user data 20 and the display area 21 set in the superior user data 20 (S107), and ends this routine.

(Information Processor 1: Slot Game Process)

Figure 12:
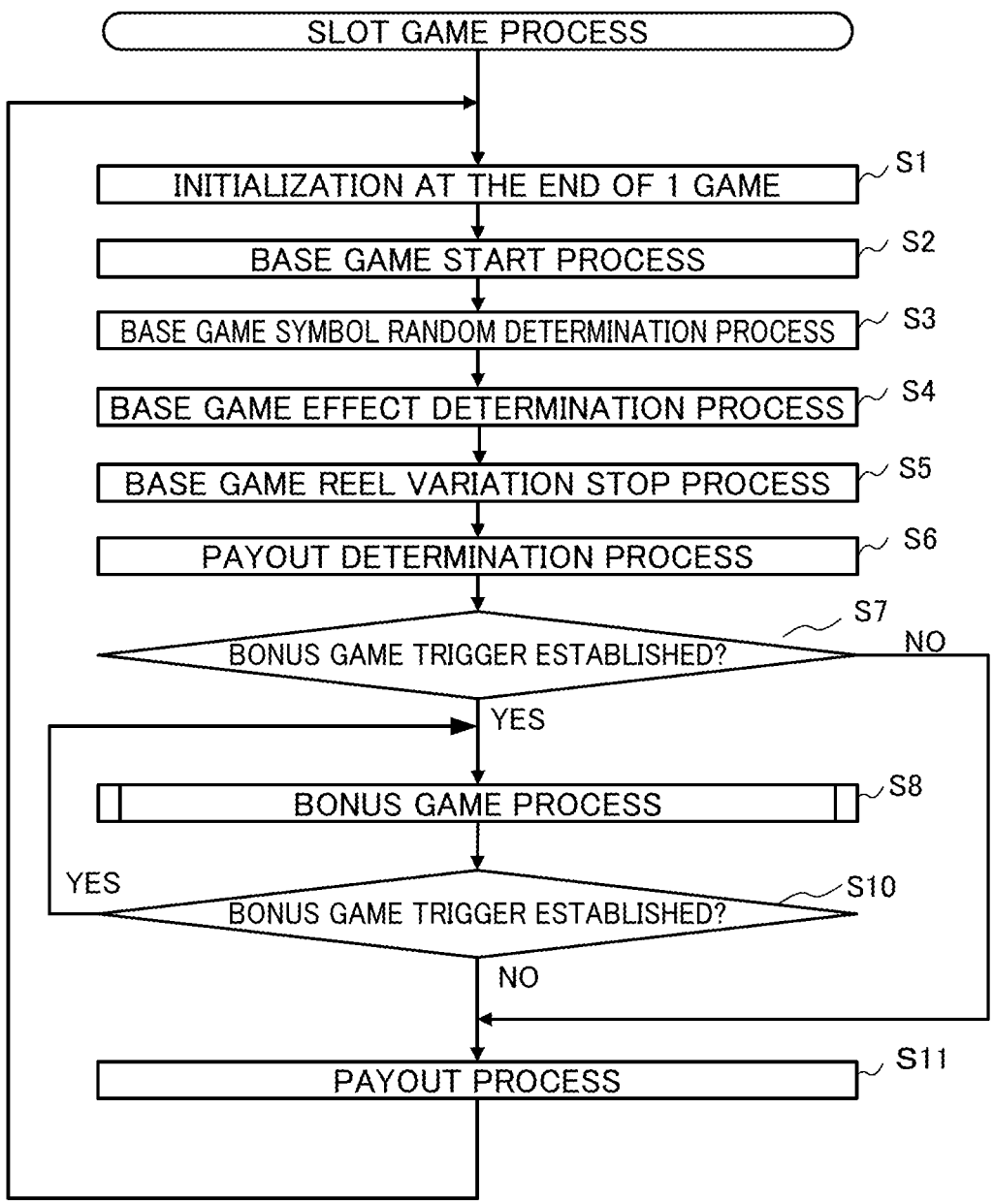
FIG. 12 is a flowchart of a slot game process.

Next, with reference to FIG. 12, the following describes the game program in relation to a slot game process executed by the CPU 101 of the information processor 1.

As shown in FIG. 12, an initializing process at the end of each play of the game is executed (S1). For example, this process clears data in a working area of the RAM 103, which becomes unnecessary at the end of each play of game, e.g., the bet amount and symbols selected by random determination. After a base game start process (S2), a base game symbol random determination process is executed (S3). In this process, to-be-stopped symbols are randomly selected and determined based on a random number by using a symbol random determination table.

Then a base game effect determination process is executed (S4). The CPU 101 samples an effect-use random number and randomly determines any of a plurality of predetermined effect contents, and executes the determined effect content at the determined timing. For example, an effect image is displayed in an effect area 292 of the display 2, and sound is output by the speaker 115.

Then a base game reel variation stop process is executed (S5). In this process, the scroll of the symbol columns in the symbol display area 21*a* starts, and the to-be-stopped symbols determined in the base game symbol random determination process are stopped at predetermined positions.

Then a payout amount determination process is executed (S6). In the base game, a payout amount is determined in accordance with a combination of symbols and based on a payout table, and the determined payout amount is stored in a payout amount storage area of the RAM 103. When the bonus game trigger is established, a payout amount is determined in accordance with a combination of bonus symbols, based on a rule different from the rule in the base game.

Then whether the bonus game trigger has been established is determined (S7). When the bonus game trigger has been established (S7: YES), a bonus game process is executed (S8). Thereafter, when the bonus game trigger has been established (S10: YES), the bonus game process in S8 is executed again.

In the meanwhile, if the bonus game trigger has not been established in S7 or S10 (S7 or S10: NO), a payout process is executed (S11). The CPU 101 adds a value stored in the payout amount storage area to a value stored in a credit amount storage area (credit counter) provided in the RAM 103. Then the steps are executed again from S1.

(Information Processor 1: Bonus Game Process)

Figure 13:
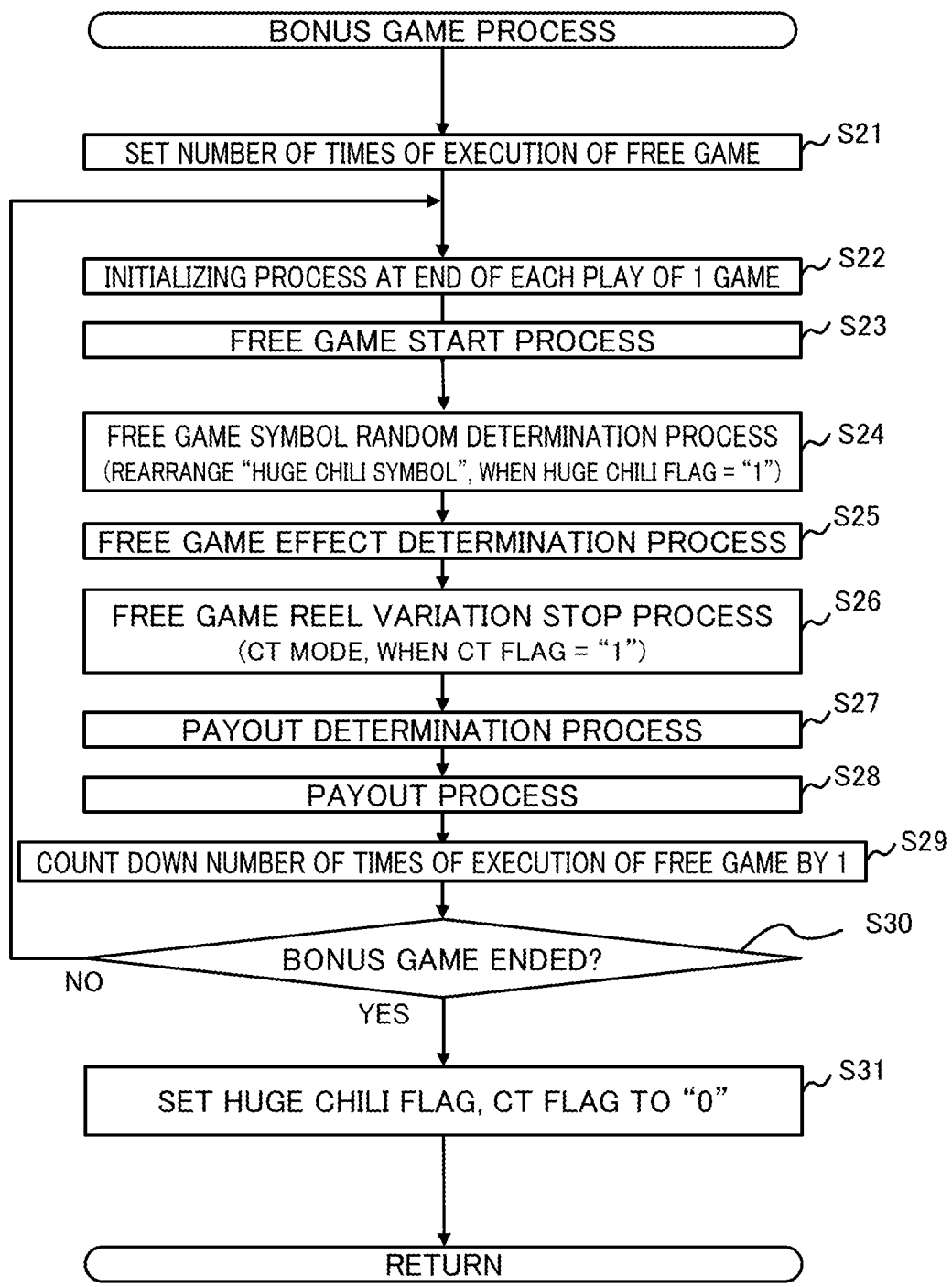
FIG. 13 is a flowchart of a bonus game process.

Next, with reference to FIG. 13, the following describes the game program in relation to a bonus game process which is a sub routine of the slot game process executed by the CPU 101 of the information processor 1.

To begin with, the number of times of execution of the free game is set (S21). For example, the number of times of execution of the free game is set at 5. Then an initializing process at the end of each play of the game is executed (S22). For example, this process clears data in a working area of the RAM 103, which becomes unnecessary at the end of each play of game, e.g., the symbols selected by random determination. It is noted that the bet amount in the bonus game is identical with the bet amount in the base game immediately before the shift to the bonus game.

Thereafter, in the same manner as in the base game, a free game start process (S23), a free game symbol random determination process (S24), and a free game effect determination process (S25) are executed. In the free game, a free game symbol random determination table different from the symbol random determination table in the base game is used. In the free game symbol random determination process, when a Huge Chili flag is set at 1, random determination is executed such that a Huge Chili symbol is to be rearranged.

Thereafter, a free game reel variation stop process (S26) is executed to vary and stop the reels. In this process, the free game is shifted to a CT mode when a CT flag is set at 1. In this mode, the user is allowed to forcibly stop the reels by an operation. Thereafter, a payout amount determination process (S27) and a payout process (S28) are serially executed, and then the number of times of execution of the free game is counted down by 1 (S29). Then whether the bonus game has ended is determined (S30). When the number of times of execution of the free game is not 0 (S30: NO), the steps are executed again from S22 as it is determined that the bonus game has not ended. In the meanwhile, when the number of times of execution of the free game is 0 (S30: YES), it is determined that the bonus game has ended. Then the Huge Chili flag and the CT flag are set at 0 (S31). As such, the flags are maintained at 0 in the bonus game after the base game, and the flags are changed from 1 to 0 in the bonus game after the random determination game. The process is then terminated and the processing routine shown in FIG. 13 is resumed.

Though not shown, when the amount of payout is determined in the slot game process and the bonus game process, the CPU 101 executes a process of transmitting the amount of payout as the number of acquisitions to the server 10.

(Server 10: Operation)

Next, with reference to FIG. 14, the following describes a game program in relation to a server process executed by the CPU 1101 of the server 10.

First, the CPU 1101 determines whether or not rank information is requested from the information processor 1 (S200). When rank information is requested from the information processor 1, the CPU 1101 refers to the rank table and the friend information table, and acquires rank information (S201). Specifically, as described above, the CPU 1101 refers to the rank table to acquire information on superior users. Then the CPU 1101 refers to the friend information table, and if there is the friend information associated with the user corresponding to the information processor 1 which has sent the request, the CPU 1101 acquires the friend information. Then, as a response, the CPU 1101 returns these pieces of information as rank information to the information processor 1 which has sent the request (S202). As described above, the information processor 1 which has received the rank information as a response displays the rank screen 22 on the display 2.

In the step S200, when the rank information has not been requested from the information processor 1 (S200: NO), or after the step S202, the CPU 1101 determines whether or not a friend request has been made (S203). When a friend request is made, the friend information table is updated (S204). Specifically, in a friend information table process, the CPU 1101 newly creates data of the user corresponding to the information processor 1 which has sent the request and the user of the friend application target, and sets the state in the table as "approval-waiting state". Thereafter, to the information processor of the friend-request target user, a notification is made to ask the user to input whether or not to approve the friend request (S205).

In the step S203, when no friend request is made (S203: NO), or after the step S205, the CPU 1101 determines whether or not the number of acquisitions has been received (S206). When the number of acquisitions is received (S206: YES), the CPU 1101 updates the user information table (S207). Specifically, the CPU 1101 determines in which type of the slot game out of a plurality of the slot games coins are acquired, and the acquisition coin number in the column of the determined type of the slot game in the user information table is accumulatively increased. Further, when the acquisition coin number added at this time satisfies a predetermined condition, points are cumulatively added to the point-number column in the user information table.

Here, the predetermined condition for adding points will be specifically described. In the present embodiment, four kinds of thresholds are provided for the predetermined condition. A first threshold, a second threshold, a third threshold, and a fourth threshold are provided in ascending order. The CPU 1101 increases the number of points to be added each time the number of acquisitions in the slot game exceeds each threshold. For example, the CPU 1101 adds 3 points to the user who acquires the number of acquisitions exceeding the first threshold, adds 4 points when the number exceeds the second threshold, adds 5 points when the number exceeds the third threshold, and adds 10 points when the number exceeds the fourth threshold. The first threshold, the second threshold, the third threshold, and the fourth threshold may be each associated with a prize in the slot game. That is, as a result of the slot game, the CPU 1101 determines that the first threshold has been exceeded when a prize corresponding to the first threshold was won, determines that the second threshold has been exceeded when a prize corresponding to the second threshold was won, determines that the third threshold has been exceeded when a prize corresponding to the third threshold was won, and determines that the fourth threshold has been exceeded when a prize corresponding to the fourth threshold was won.

In addition, when a user who acquires the number which exceeds a threshold has one or more friend, points are added to that friend as well. The CPU 1101 cumulatively adds points, the number of which is lower than the number of points acquired by the user, to the point-number column in the user information table of the friend user. To be more specific, the CPU 1101 adds 2 points to all friend users of the user who acquires the number of acquisitions exceeding the first threshold, adds 3 points when the number exceeds the second threshold, adds 4 points when the number exceeds the third threshold, and adds 8 points when the number exceeds the fourth threshold.

After the step S207, the CPU 1101 determines whether or not there is a user whose point has reached a predetermined number as a result of the addition of the points (S208). When there is a user whose point has reached a predetermined number (S208: YES), an item is awarded to the user (S209). In the step S209, the CPU 1101 resets the number of points in the user information table to the number obtained by subtracting the predetermined number from the number of points.

It should be noted that items awarded when the point reaches a predetermined number are not particularly limited as long as they make the game advantageous. For example, they may be items for making the slot game advantageous, they may be in-game currency exchanged with an item for favorably advancing the slot game, or coins for starting the slot game.

When the number of acquisitions is not received in the step S206 (S206: NO), when there is no user whose point has reached a predetermined number in the step S208 (S208: NO), or after the step S209, the CPU 1101 determines whether or not a predetermined interval has ended (S210). When the predetermined interval has ended, the CPU 1101 updates the rank table based on the user information table (S211). At this time, the CPU 1101 resets the count for the predetermined interval, and starts the count again.

When the predetermined interval has not ended in the step S210 (S210: NO), or after the step S211, the CPU 1101 determines whether or not the predetermined period has ended (S212). When the predetermined period has ended (S212: YES), the CPU 1101 resets the number of acquired coins in the user information table to 0 (S213). Then, the CPU 1101 resets all the ranking tables (S214).

When a predetermined period has not ended in the step S212 (S212: NO), or after the step S214, the CPU 1101 shifts to the step S210.

(Modification)

In the above-described embodiment, the ranking of users can be changed at predetermined intervals according to the play of the users, but the disclosure is not limited to this. For example, the rank may be fixed until a predetermined period elapses. For example, after the rank is determined based on the number of the accumulated coins in the 'N'-th (N is a natural number) predetermined period, the rank of the N-th time is reflected on the rank screen 22 in the N+1-th predetermined period. That is, in the N+1-th predetermined period, the rank in the N-th predetermined period may be fixedly used. Further, a limit may be set on the number of friend requests during a predetermined period.

Overview of the Invention

The game system 100 includes a plurality of information processors 1 and a server 10 which allows users to log in the plurality of information processors 1 and execute a game. The game system 100 further includes a display 2 which shows a screen in the information processor 1, a memory 3 which stores a relation between the user identification information corresponding to a user who plays the game by using plural information processors 1 and the user identification information corresponding to another user who is a friend of the user, and a controller 4. The controller 4 is programmed to execute the processes of: storing, in the memory 3, the rank determined based on the game history of plural users, in association with the user identification information;

receiving a rank screen transition request which causes a transition to the rank screen 22 in which a predetermined number of sets of the user identification information of the users ranked at or above a predetermined rank is displayed; and acquiring the superior user identification information in response to the rank screen transition request, with reference to the memory 3. The controller 4 is programmed to further execute the processes of: constructing the rank screen 22 in which each set of superior user identification information is associated with each friend-request button and displaying the constructed screen on the display 2; and when a friend-request button is operated on the rank screen 22, accepting the friend request for the user corresponding to that friend-request button from the user who has made the request by the information processor 1; and shifting to a state that allows these users to become friends.

According to the above arrangement, on the rank screen 22, users who are highly ranked based on the game history are displayed in association with the friend-request buttons. This makes it easy for users to send a friend request to a highly-ranked user, so that a lot of users would send a friend request to a highly-ranked user. As a result, it is possible to encourage users who wish to increase the number of friends to aim at becoming highly-ranked users, and it is possible to provide users with a motivation to continue the game until they become highly-ranked users.

In the game system 100 of the present invention, the controller 4 is programmed to execute the processes of: outputting the number of acquisitions in accordance with a result of the game; determining rank according to the cumulative number of acquisitions; and making friends associated with the user advantageous when the number of acquisitions of the user satisfies a predetermined condition.

According to the above arrangement, ranking is determined by the cumulative number of acquisitions outputted as a result of the game, and when the number of acquisitions outputted is equal to or larger than a threshold, friends of the user who outputs that number of acquisitions are made advantageous. Since the cumulative number of acquisitions of a highly-ranked user is larger than that of other users, it is recognized that such a user is likely to output the number of acquisitions that satisfies the predetermined condition. For this reason, the higher a user is ranked, the more friend-requests he or she is likely to receive. As a result, it is possible to encourage users who wish to increase the number of friends to aim at becoming highly-ranked users.

In the game system 100 of the present invention, the controller 4 is programmed to execute the processes of: cumulatively storing points corresponding to the number of acquisitions of each user; when the number of acquisitions of a user satisfies a predetermined condition, awarding a point to a friend associated with that user; and awarding an item for making the game advantageous to the user, when the points corresponding to the user reach a predetermined number.

According to the above arrangement, when a user outputs the number of acquisitions which satisfies a condition in the game, not only that user but also friends associated with that user acquire points corresponding to the number of acquisitions. The points are cumulatively stored for each user, and a user whose point reach a predetermined number acquires the item which makes the game advantageous. It is recognized from other users that highly-ranked users output a large number of acquisitions, and as the ranking is higher, the user may get more friend-requests from other users who expect points from the friends. As a result, it is possible to encourage users who wish to increase the number of friends to aim at becoming highly-ranked users.

The game program of the present invention causes a computer, including the display 2 which shows a screen in the information processor 1 which logs in the server 10 connected a plurality of information processors 1, and a memory 3 storing a relation between user identification information corresponding to a user who plays a game by using the plurality of information processors 1 and user identification information corresponding to another user who is a friend of the user, to execute the processes of: storing, in the memory 3, the ranking determined based on the game history of plural users in association with the user identification information; accepting a rank screen transition request for transition to the rank screen 22 in which a predetermined number of sets of the user identification information of the users ranked at or above a predetermined rank is displayed; acquiring the highly-ranked user identification information in response to the rank screen transition request, with reference to the memory 3; constructing the rank screen 22 in which each set of superior user identification information is associated with each friend-request button, and displaying the screen on the display 2; and when a friend-request button is operated on the rank screen 22, accepting a friend request for the user corresponding to that friend-request button from the user who logs in the information processor 1 which has made the request; and shifting to a state that allows these users to become friends.

According to the above construct, on the rank screen 22, users who are highly ranked based on the game history are displayed in association with the friend-request buttons. This makes it easy for users to send a friend request to a highly-ranked user, so that a lot of users would send a friend request to a highly-ranked user. As a result, it is possible to encourage users who wish to increase the number of friends to aim at becoming highly-ranked users, and it is possible to provide users with a motivation to continue the game until they become highly-ranked users.

The present invention is a game control method which is executed by a computer including the display 2 which shows a screen in the information processor 1 which logs in the server 10 connected a plurality of information processors 1, and the memory 3 which stores a relation between the user identification information corresponding to a user who plays the game by using plural information processors 1 and the user identification information corresponding to another user who is a friend of the user. The computer executes the processes of: storing, in the memory 3, the ranking determined based on the game history of plural users in association with the user identification information; accepting a rank screen transition request for transition to the rank screen 22 in which a predetermined number of sets of the user identification information of the users ranked at or above a predetermined rank is displayed; acquiring the highly-ranked user identification information in response to the rank screen transition request, with reference to the memory 3; constructing the rank screen 22 in which each set of superior user identification information is associated with each friend-request button, and displaying the screen on the display 2; and when a friend-request button is operated on the rank screen 22, accepting a friend request for the user corresponding to that friend-request button from the user who logs in the information processor 1 which has made the request; and shifting to a state that allows these users to become friends.

According to the above arrangement, on the rank screen 22, users who are highly ranked based on the game history are displayed in association with the friend-request buttons. This makes it easy for users to send a friend request to a highly-ranked user, so that a lot of users would send a friend request to a highly-ranked user. As a result, it is possible to encourage users who wish to increase the number of friends to aim at becoming highly-ranked users, and it is possible to provide users with a motivation to continue the game until they become highly-ranked users.

Embodiments of the present invention thus described above solely serve as specific examples of the present invention, and are not to limit the scope of the present invention. The specific structures and the like are suitably modifiable. Further, the effects described in the embodiments of the present invention are no more than examples of preferable effects brought about by the present invention, and the effects of the present invention are not limited to those described hereinabove.

Further, the detailed description above is mainly focused on characteristics of the present invention to for the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the present invention described in this specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

What is claimed is:

1. A game system comprising a plurality of information processors, and a server configured to allow users to log in and run a game in the plurality of information processors, the system further comprising:

a display configured to display a screen on each of the information processors;
a memory storing a relation between user identification information corresponding to each of the users who play the game by using the plurality of information processors and the user identification information corresponding to another user who is a friend of each of the users; and
a controller,
the controller being programmed to execute processes of:
storing, in the memory, ranking determined based on history of the game of the users, in association with the user identification information;
accepting a rank screen transition request for transition to a rank screen in which a predetermined number of sets of the user identification information of the users ranked at or above a predetermined rank is displayed;
referring to the memory in response to the rank screen transition request and acquiring the user identification information of highly-ranked users at the ranking;
constructing the rank screen in which each set of the user identification information of the highly-ranked users at the ranking is associated with a friend-request button and a cumulative number of gaming values, and displaying the rank screen on the display;
when the friend-request button is operated on the rank screen, accepting a friend request for a first user corresponding to the operated friend-request button among the users from a second user who has made the friend request, and shifting to a state that allows the first and second users to become friends;
outputting a number of gaming values in accordance with a result of the game of the first user;
increasing the cumulative number of gaming values for the first user in accordance with the number of gaming values; and
awarding points to a friend associated with the first user when the cumulative number of gaming values of the first user satisfies a predetermined condition.

2. The game system according to claim 1, wherein the controller is further programmed to execute processes of:
cumulatively storing points corresponding to the number of gaming values of the first user; and
awarding an item to the first user, when the cumulative points corresponding to the first user reach a predetermined number.

3. A non-transitory computer-readable medium storing a game program causing a computer, which includes a display which shows a screen in each of information processors which logs in a server connected to the information processors and a memory storing a relation between user identification information corresponding to each of the users who play the game by using the plurality of information processors and the user identification information corresponding to another user who is a friend of each of the users, to execute the processes of:
storing, in the memory, ranking determined based on history of the game of the users, in association with the user identification information;
accepting a rank screen transition request for transition to a rank screen in which a predetermined number of sets of the user identification information of the users ranked at or above a predetermined rank is displayed;
referring to the memory in response to the rank screen transition request and acquiring the user identification information of highly-ranked users at the ranking;

constructing the rank screen in which each set of the user identification information of the highly-ranked users at the ranking is associated with a friend-request button and a cumulative number of gaming values, and displaying the rank screen on the display;

when the friend-request button is operated on the rank screen, accepting a friend request for a first user corresponding to the operated friend-request button among the users from a second user who has made the friend request, and shifting to a state that allows the first and second users to become friends;

outputting a number of gaming values in accordance with a result of the game of the first user;

increasing the cumulative number of gaming values for the first user in accordance with the number of gaming values; and awarding points to a friend associated with the first user when the cumulative number of gaming values of the first user satisfies a predetermined condition.

4. A game control method executed by a computer including a display which shows a screen in an information processor which logs in a server connected to a plurality of information processors a memory storing a relation between user identification information corresponding to each of the users who play the game by using the plurality of information processors and the user identification information corresponding to another user who is a friend of each of the users, and the computer executes the processes of: storing, in the memory, ranking determined based on history of the game of the users, in association with the user identification information;

accepting a rank screen transition request for transition to a rank screen in which a predetermined number of sets of the user identification information of the users ranked at or above a predetermined rank is displayed;

referring to the memory in response to the rank screen transition request and acquiring the user identification information of highly-ranked users at the ranking;

constructing the rank screen in which each set of the user identification information of the highly-ranked users at the ranking is associated a friend-request button and a cumulative number of gaming values, and displaying the rank screen on the display;

when the friend-request button is operated on the rank screen, accepting a friend request for a first user corresponding to the operated friend-request button among the users from a second user who has made the friend request, and shifting to a state that allows the first and second users to become friends, outputting a number of gaming values in accordance with a result of the game of the first user;

increasing the cumulative number of gaming values for the first user in accordance with the number of gaming values; and awarding points to a friend associated with the first user when the cumulative number of gaming values of the first user satisfies a predetermined condition.

5. A game system comprising a plurality of information processors, and a server configured to allow users to log in and run a game in the plurality of information processors, the system further comprising:

a display configured to display a screen on each of the information processors;

a memory storing a relation between user identification information corresponding to each of the users who play the game by using the plurality of information processors and the user identification information corresponding to another user who is a friend of each of the users; and a controller, the controller being programmed to execute processes of:

storing, in the memory, ranking determined based on history of the game of the users, in association with the user identification information;

accepting a rank screen transition request for transition to a rank screen in which a predetermined number of sets of the user identification information of the users ranked at or above a predetermined rank is displayed;

referring to the memory in response to the rank screen transition request and acquiring the user identification information of highly-ranked users at the ranking;

constructing the rank screen in which each set of the user identification information of the highly-ranked users at the ranking is associated with a friend-request button and a cumulative number of gaming values, and displaying the rank screen on the display;

when the friend-request button is operated on the rank screen, accepting a friend request for a first user corresponding to the operated friend-request button among the users from a second user who has made the friend request, and shifting to a state that allows the first and second users to become friends;

outputting a number of gaming values in accordance with a result of the game of the first user;

increasing the cumulative number of gaming values for the first user in accordance with the number of gaming values;

awarding points to friends associated with the first user when the cumulative number of gaming values of the first user satisfies a predetermined condition;

determining whether there is a user whose points reach a first predetermined number among the friends associated with the first user;

awarding an item to a third user when the points associated with the user identification information of the third user reach the first predetermined number;

subtracting the first predetermined number from a number of the points associated with the user identification information of the third user; and storing the subtracted number of the points in association with the user identification information of the third user.

6. The game system according to claim 5, wherein the controller is further programmed to execute processes of:

cumulatively storing points corresponding to the number of gaming values of the first user; and awarding an item to the first user when the cumulative points corresponding to the first user reach a second predetermined number.

* * * * *